(12) United States Patent
Ikegami et al.

(10) Patent No.: US 6,987,869 B1
(45) Date of Patent: Jan. 17, 2006

(54) AUTHENTICATION DEVICE USING ANATOMICAL INFORMATION AND METHOD THEREOF

(75) Inventors: Jun Ikegami, Kawasaki (JP); Takashi Shinzaki, Kawasaki (JP); Yusaku Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 09/627,096

(22) Filed: Jul. 27, 2000

(30) Foreign Application Priority Data

Oct. 15, 1999 (JP) ................................ 11-293543

(51) Int. Cl.
*G06K 9/00* (2006.01)
(52) U.S. Cl. ..................... 382/115; 340/5.52; 340/5.8; 902/5
(58) Field of Classification Search ........ 382/115–127; 356/71; 340/5.52, 5.53, 5.8–5.83; 902/3, 902/5
See application file for complete search history.

(56) References Cited

U.S. PATENT DOCUMENTS

| 5,764,789 A | 6/1998 | Pare, Jr. et al. ............. 382/115 |
| 6,553,494 B1 * | 4/2003 | Glass ......................... 713/186 |

FOREIGN PATENT DOCUMENTS

| WO | WO 98/50875 | 11/1998 |
| WO | WO 98/55930 | 12/1998 |
| WO | WO 99/00720 | 1/1999 |
| WO | WO 00/42577 | 7/2000 |

OTHER PUBLICATIONS

European Patent Office, Communication pursuant to Article 96(2) EPC; Jan. 29, 2003, pp. 1-3.
European Office Action dated Mar. 17, 2005 in corresponding European Application No. 00 306 908.5-2212.
"Variations on the Themes of Message Freshness and Replay", Li Gong, IEEE Comput. Soc., 1993, pp. 131-136.

* cited by examiner

*Primary Examiner*—Jon Chang
*Assistant Examiner*—Charles Kim
(74) *Attorney, Agent, or Firm*—Staas & Halsey LLP

(57) ABSTRACT

Collation information comprises anatomical information, such as finger print feature information, etc., and identification information. For the identification information, the serial number or equipment description of a device by which the anatomical information is collected, information about a route taken between a collection device and an authentication device or serial number attached to anatomical information collected by a specifying device, etc., is used instead of conventional time information. Then, the entire collation information is encrypted and is transmitted from an anatomical information collecting device to an authentication device via a network.

6 Claims, 27 Drawing Sheets

$a0 = H_a$ (FINGER PRINT DATA)

$a1 = H_{a0}$ (D(route1))

$a2 = H_{a1}$ (D(route2))

Ha(x) : ONE-DIRECTION MAPPING VALUE (HASH VALUE) OF x CONCERNING PARAMETER a
D(x) : DIGEST INFORMATION (HASH VALUE) OF x

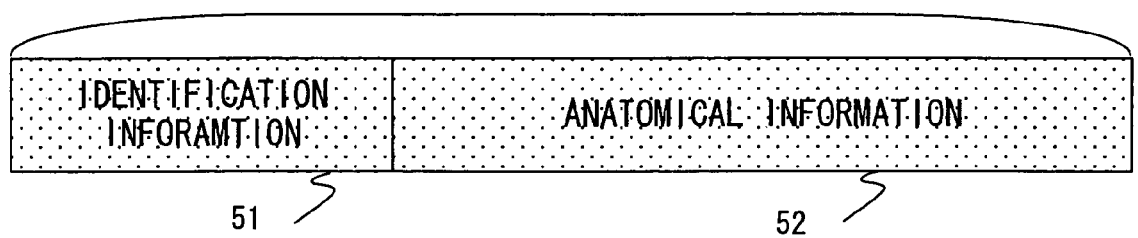
F I G. 3

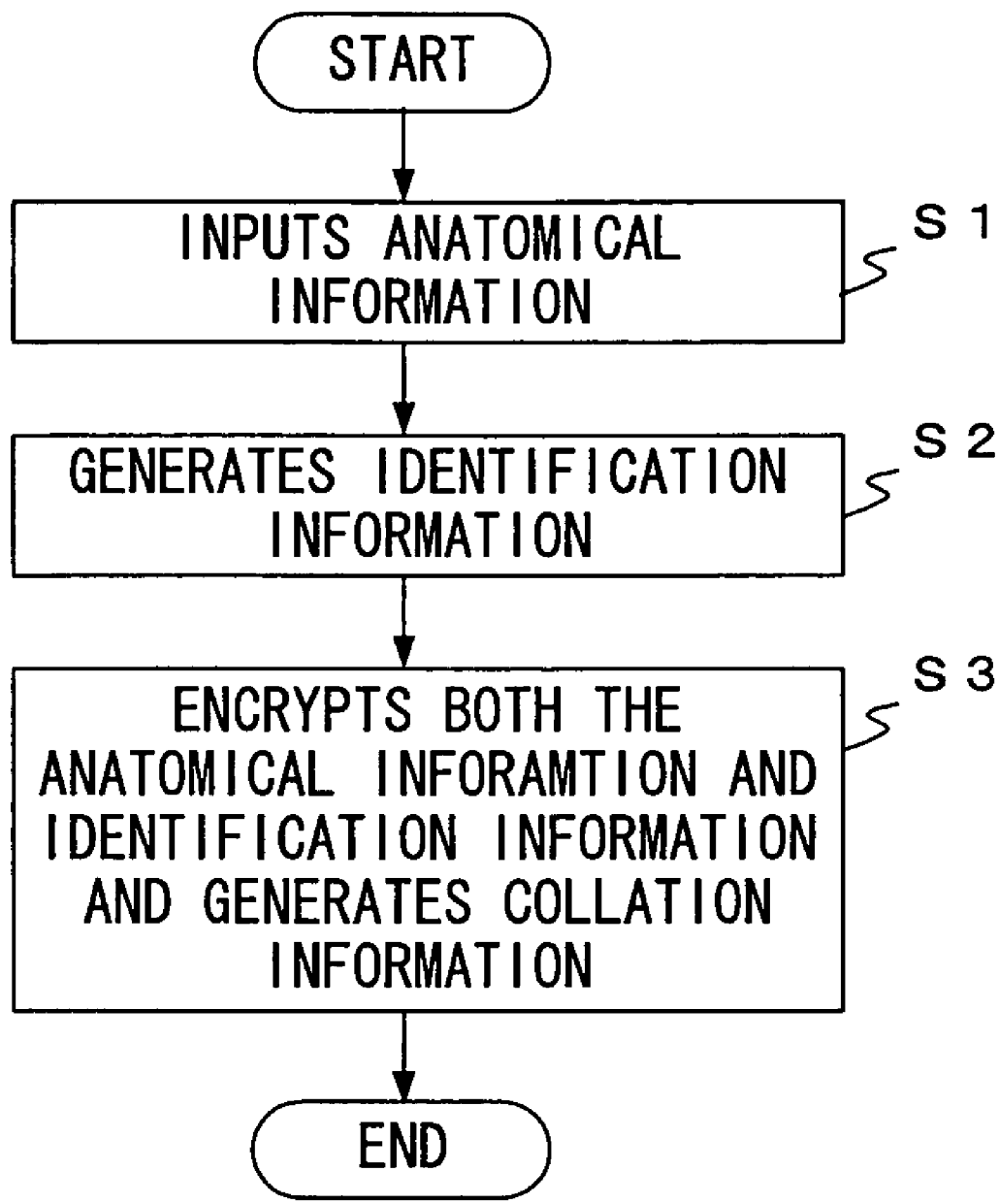
F I G. 4

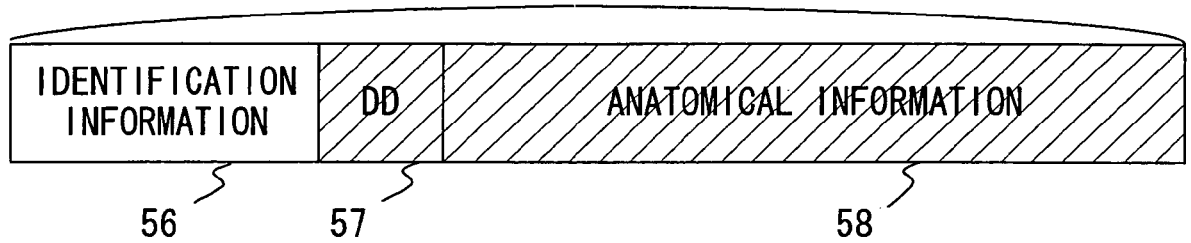
F I G. 8

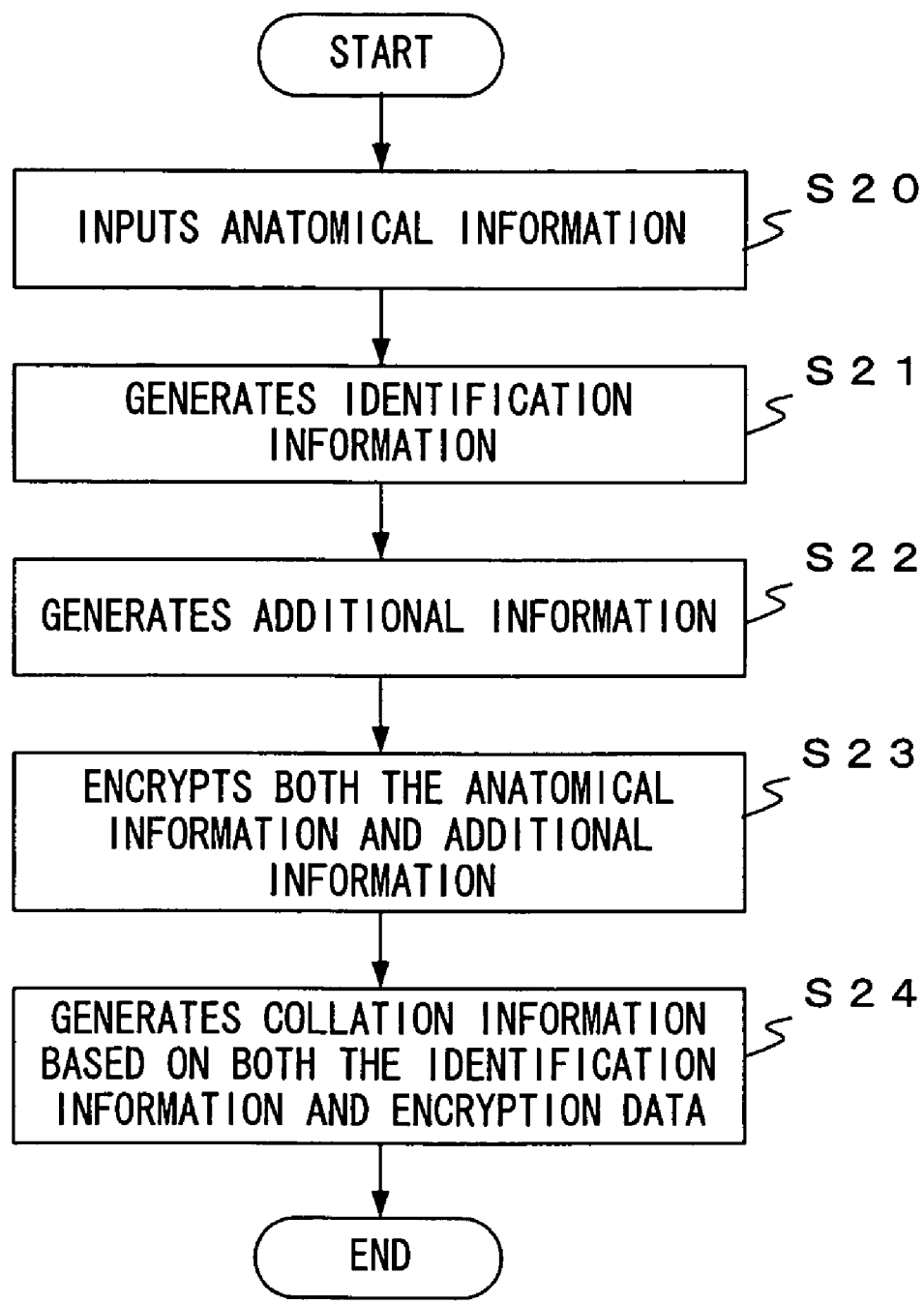
F I G. 9

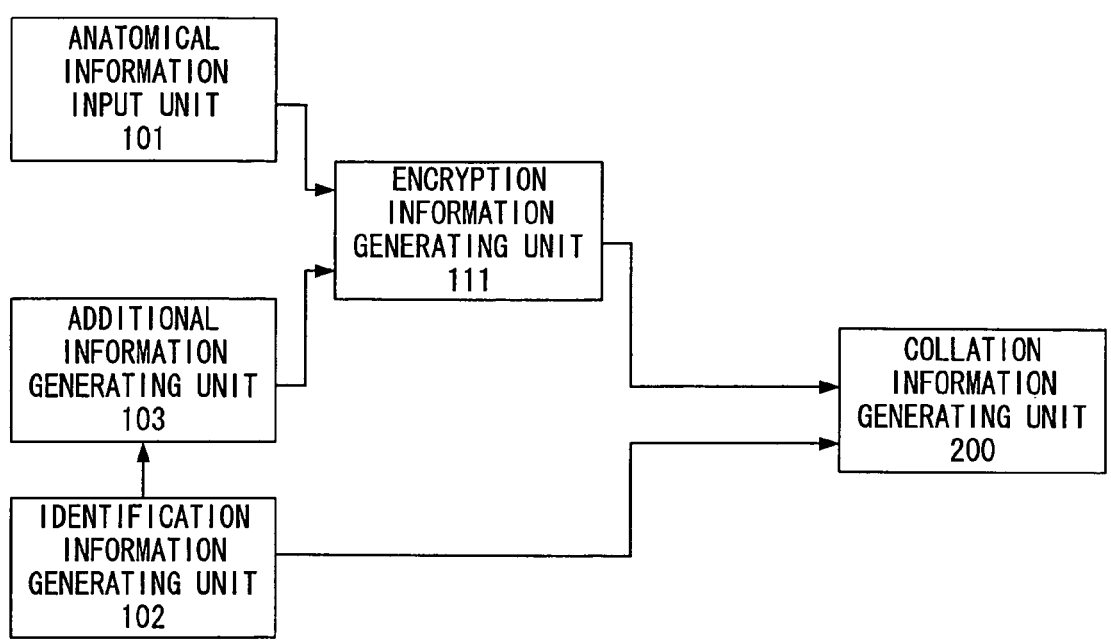
F I G. 10

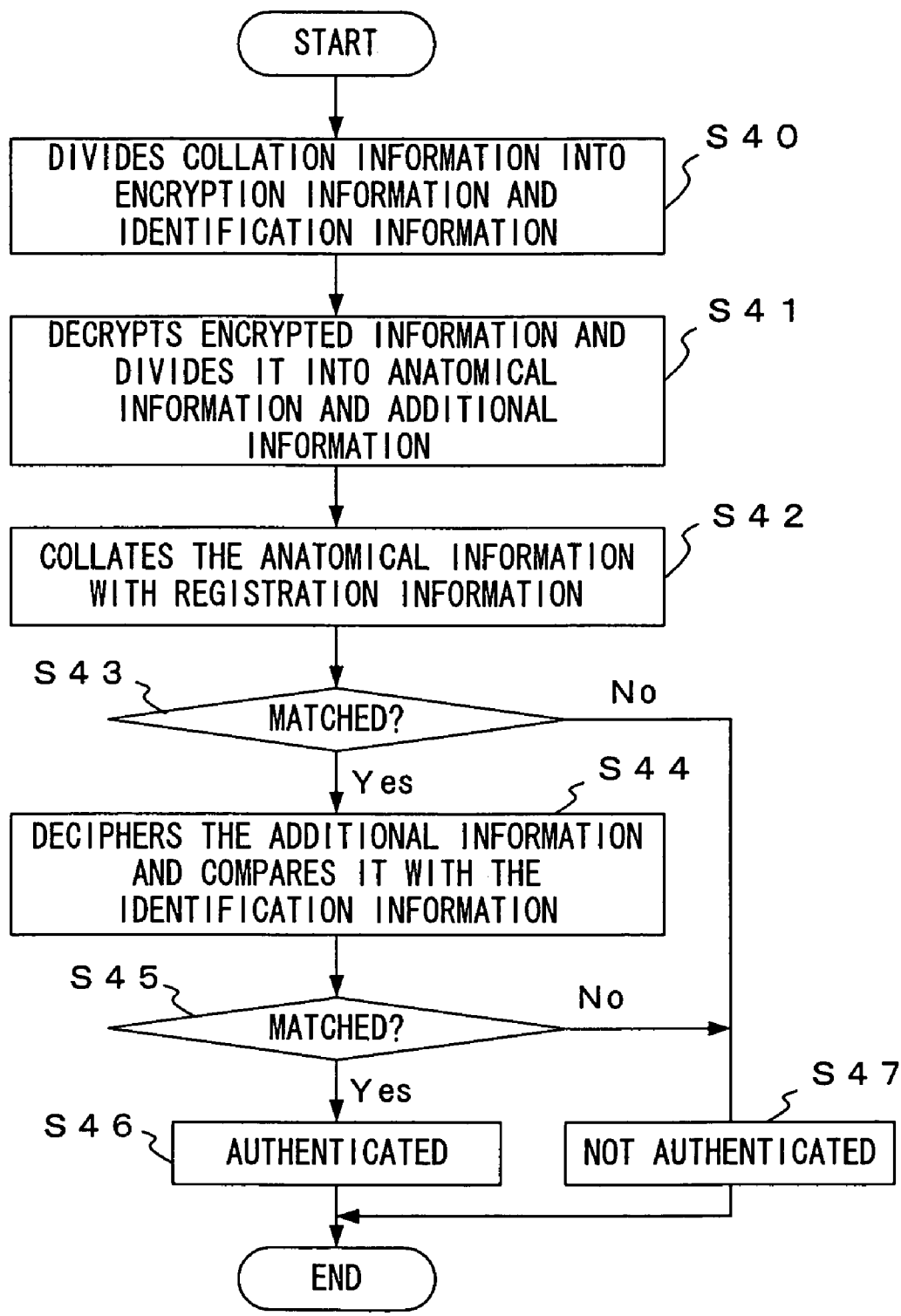
F I G. 1 2

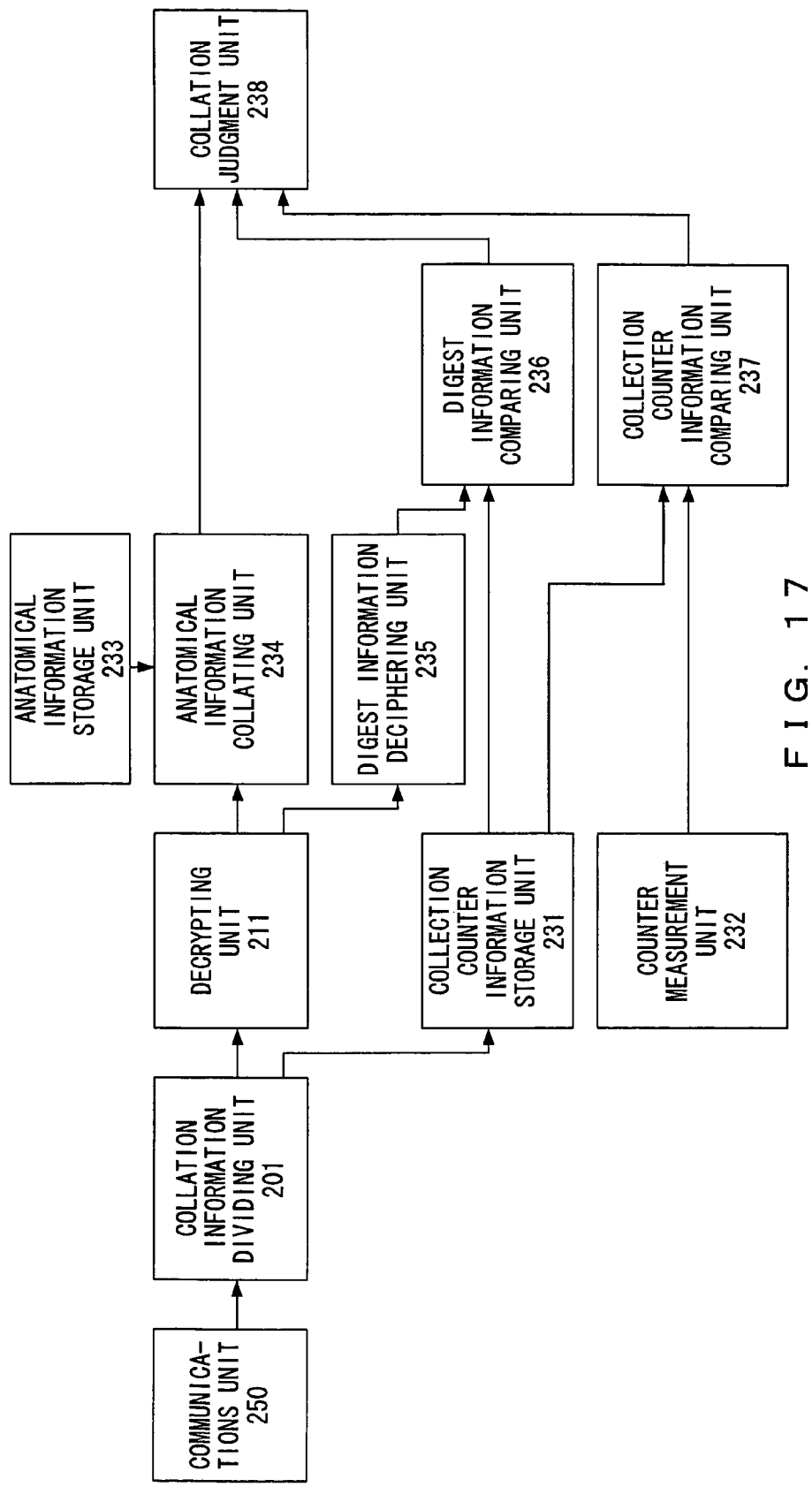
F I G. 17

| a0 | FINGER PRINT DATA | (1)

$a0 = H_a$ (FINGER PRINT DATA)

| route1 | a1 | a0 | FINGER PRINT DATA | (2)

$a1 = H_{a0}$ (D (route1))

| route2 | route1 | a2 | a0 | FINGER PRINT DATA | (3)

$a2 = H_{a1}$ (D (route2))

Ha(x) : ONE-DIRECTION MAPPING VALUE (HASH VALUE) OF x CONCERNING PARAMETER a
D(x)  : DIGEST INFORMATION (HASH VALUE) OF x

F I G. 1 9

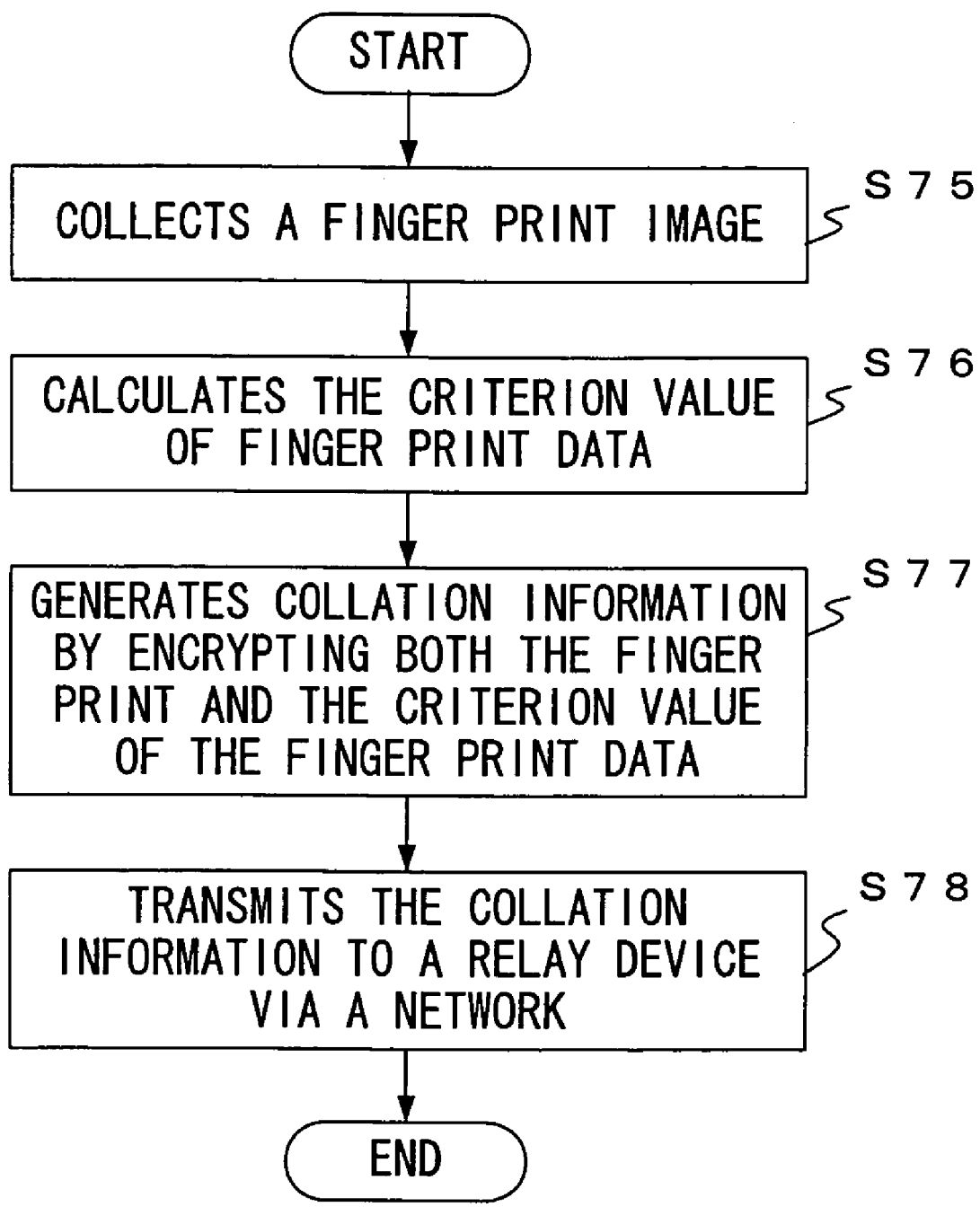
F I G. 2 1

AUTHENTICATION DEVICE USING ANATOMICAL INFORMATION AND METHOD THEREOF

BACKGROUND OF THE INVENTION

1. Field of the Invention

The present invention relates to an authentication device using anatomical information and a method thereof.

2. Description of the Related Art

Recently, a variety of authentication devices using anatomical information, such as finger print information, voice print information, iris information, face information, etc., have been sold. Authentication systems using such an authentication device on a network have also been widely used. In the case of an authentication system on a network, an apparatus called an authentication server often manages registration data collectively. For example, in the case of an authentication by a finger print, finger print feature information is collected on a client side provided with a finger print input device and is transferred to an authentication server. A server side performs collation based on the finger print feature information and confirms that the user is authenticated. Then, the server side performs processes, such as access permission, etc.

The assurance of confidentiality in transferring anatomical information to an authentication server is a major problem in improving the security of these systems.

FIG. 1 shows an example of the configuration of a conventional authentication system using anatomical information.

The conventional authentication system using anatomical information comprises a terminal device 1 for obtaining the finger print information of a user to be authenticated, encrypting the information and transmitting the information to a central device via a network 3 together with time information specifying when the finger print information has been obtained, and a central device 2 for deciphering both the encrypted finger print information and time information received via the network 3 based on registered finger print information and performing the authentication of the received finger print information together with the receiving time information.

The finger print information obtaining unit 11 of the terminal device 1 obtains the finger print information of a user to be authenticated by a user pressing his/her finger print on a predetermined place. An encrypting unit 12 encrypts the obtained finger print information under a predetermined procedure. A clock unit 13 generates first real time information. A packet generation/transmitting unit 14 combines the encrypted finger print information and the first real time information into packet data and transmits the data. A modulation unit 15 modulates the packet data at a transmission speed corresponding to the network 3 and transmits the packet data to the network 3 via a line interface unit 16. The demodulation unit 22 of the central device 2 demodulates the modulated packet data received from the network 3 via the line interface unit 21. The demodulated packet data, for example, are assembled and decrypted in a packet data receiving/assembly unit 23 if the data are divided into cells and are transmitted as in an ATM (Asynchronous Transfer Mode) network. A decrypting unit 24 decrypts the encrypted finger print information in the assembled packet data. A finger print information registering/storage unit 25 registers the finger print information of a plurality of users. A finger print information decrypting unit 26 reads registration information from the finger print information registering/storage unit 25, collates the read registration information with the received and decrypted finger print information and judges whether the received finger print information matches the registration information. A clock unit 27 generates second real time information. If the finger print information decrypting unit 26 judges that the received finger print information matches the registration information, an authentication unit 28 compares the first real time information included in the received packet data with the second real time information, and if the time difference is not unnaturally large, the authentication unit 28 authenticates the received finger print information.

FIG. 2 shows the structure of packet data.

First, a user to be authenticated presses his/her finger on a predetermined position of the finger print information obtaining unit 11 of the terminal device 1. The finger print information obtaining unit 11 generates finger print information based on the finger print by a predetermined method and transmits the information to the encrypting unit 12. The encrypting unit 12 encrypts the received finger print information under the predetermined procedure and generates finger print information. The packet data generating/transmitting unit 14 receives time information from the clock unit 13, generates packet data 4 composed of the encrypted finger print information 41 and time information 42 as shown in FIG. 2 and transmits the information. As described above, according to the conventional authentication system using anatomical information, only anatomical information (finger print information) is encrypted.

The modulation unit 15 modulates the packet information at a transmission speed corresponding to the network 3 and transmits the information to the network 3 via the line interface 16. In the central device, the demodulation unit 22 demodulates the modulated packet data received from the network 3 via the line interface unit 21.

The packet data receiving/assembly unit 23 assembles the demodulated packet data (if they are divided and transmitted as ATM cells) as packet information and transmits the information to the decrypting unit 24. The decrypting unit 24 decrypts the received packet information under the predetermined procedure and obtains the original finger print information.

The finger print information decrypting unit 26 collates the received finger print information with a plurality of pieces of finger print information registered in the finger print information registering/storage unit 25, and if the received information and registered information match, the finger print information decrypting unit 26 transmits the information to the authentication unit 28. The authentication unit 28 compares actual time information announced by the clock unit 27 with the time information 42 included in the received packet data, and if it is judged that there is no unnatural time difference (total time period obtained by totaling the respective process time of the terminal device 1 and central device 2 and the transmission time of the network 3 is judged to be a natural time), the authentication unit 28 judges that the received finger print information belongs to the user to be authenticated. As a result, access to the place related to the authentication, such as a computer center, etc., of the user to be authenticated is allowed and the user can enter the computer center, can obtain financial information, etc.

As described above, according to even the conventional method, finger print information can be prevented from being stolen and thereby a third party can be prevented from successfully impersonating a legal user to some extent since the finger print information of a user to be authenticated is encrypted and transmitted by the terminal device 1 and the information is checked by the central device 2 together with time information about when the finger was printed for reading.

However, the conventional method has a disadvantage in that the encrypted finger print information 41 and time information 42 of packet data 4 can be easily separated and thereby a third party can successfully impersonate a legal user by generating new time information, replacing the old time information with the new time information and transmitting the finger print encryption information together with the new time information, which is a problem.

As described above, the conventional authentication system using anatomical information has a problem that a third party cannot be completely prevented from successfully impersonating a legal user and the security of highly confidential information cannot be ensured.

SUMMARY OF THE INVENTION

It is an object of the present invention to provide both an authentication device and a method using anatomical information which can completely prevent a third party from successfully impersonating a legal user in an authentication system using anatomical information.

An apparatus in the first aspect of the present invention is an authentication device using anatomical information, which comprises an anatomical information obtaining unit for obtaining anatomical information, an identification information generating unit for generating identification information which can specify the anatomical information, an additional information generating unit for generating additional information which can verify the identification information and a collation information generating unit for encrypting both the anatomical information and additional information and combining the encrypted anatomical information, encrypted additional information and the identification information into collation information.

An apparatus in the second aspect of the present invention is an authentication device using anatomical information, which comprises an anatomical information collating unit for collating anatomical information with information registered in advance, an identification information judging unit for judging whether identification information received together with the anatomical information meets prescribed requirements and an identification information verifying means for verifying the identification information using an operational value obtained by mapping the additional information.

A method in the first aspect of the present invention is a collation information generating method for authentication using anatomical information, which comprises the steps of obtaining anatomical information, generating identification information which can specify the anatomical information, generating additional information which can verify the identification information and encrypting the anatomical information and additional information and combining the encrypted anatomical information, encrypted additional information and the identification information into collation information.

A method in the second aspect of the present invention is an authentication method using anatomical information, which comprises the steps of collating anatomical information with information registered in advance, judging whether identification information received together with the anatomical information meets prescribed requirements and verifying the identification information using an operational value obtained by mapping the additional information.

According to the present invention, collation information to be transmitted comprises anatomical information, identification information which can specify the anatomical information and additional information which can be used to judge whether the identification information is legal. Therefore, a third party cannot be easily authenticated even if the third party steals the collation information while the collation information is transmitted via a network or if the third party makes a request for an illegal authentication. If the third party fails in authentication, he/she can obtain only information indicating that he/she is not authenticated. Therefore, the third party cannot also easily steal information required for authentication.

If the collation information is encrypted, the security of the confidential information can be improved.

BRIEF DESCRIPTIONS OF THE DRAWINGS

FIG. 3 shows the structure of collation information used in the first preferred embodiment of the present invention.

FIG. 4 is a flowchart showing the generation procedure of collation information in the first preferred embodiment.

FIG. 8 shows the structure, of collation information in the second preferred embodiment of the present invention.

FIG. 9 is a flowchart showing a process procedure in the third preferred embodiment of the present invention.

FIG. 10 shows an equipment configuration for generating collation information in the third preferred embodiment.

FIG. 12 is a flowchart showing a collation procedure in the third preferred embodiment.

FIG. 17 shows the configuration of a collation unit in the fourth preferred embodiment.

FIG. 19 shows a data structure used in the fifth preferred embodiment.

FIG. 21 is a flowchart showing the process procedure of the terminal device 310 shown in FIG. 20.

DESCRIPTION OF THE PREFERRED EMBODIMENTS

Figure 1:
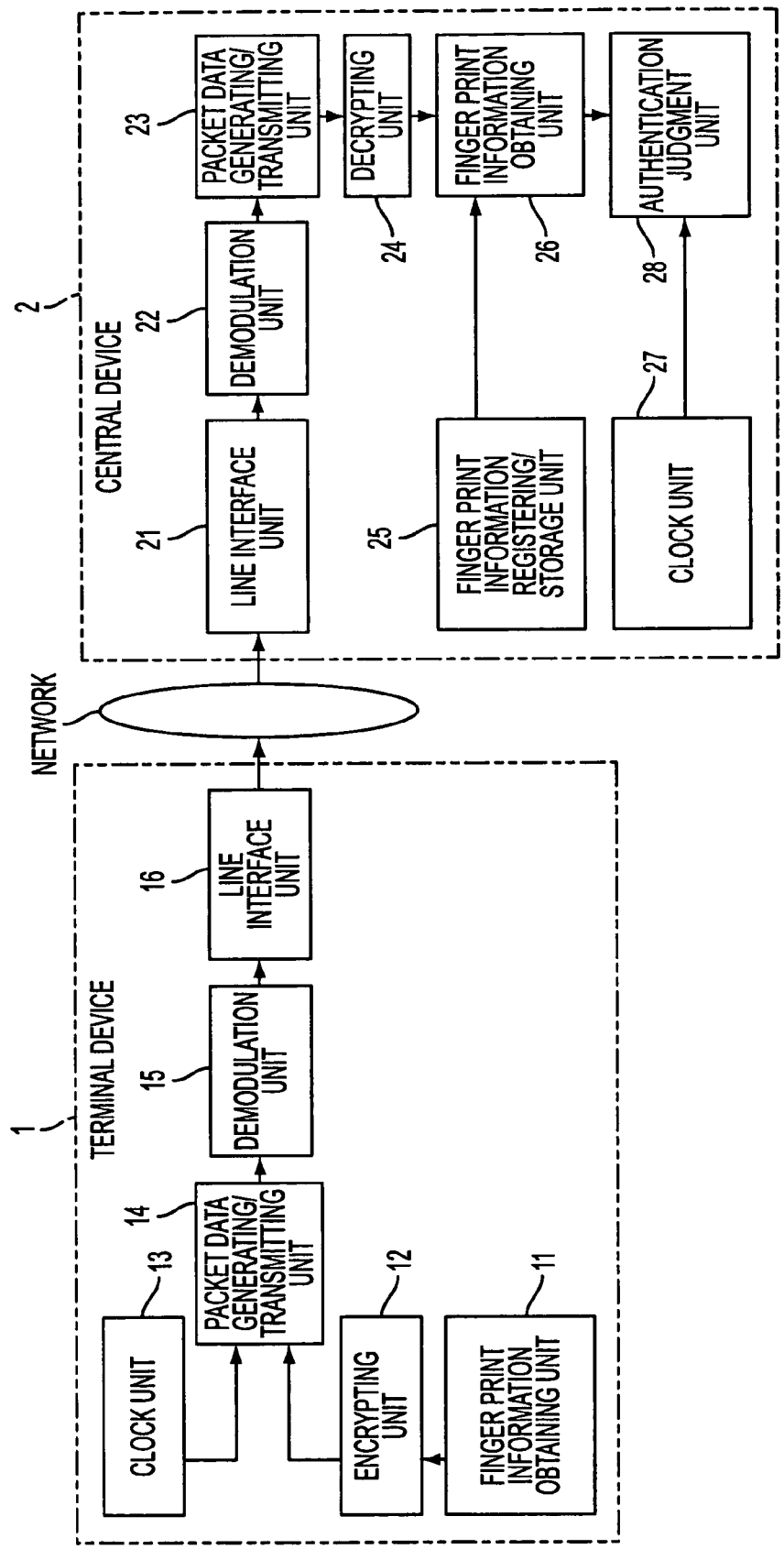
FIG. 1 shows an example of the configuration of a conventional authentication system using anatomical information.
Figure 2:
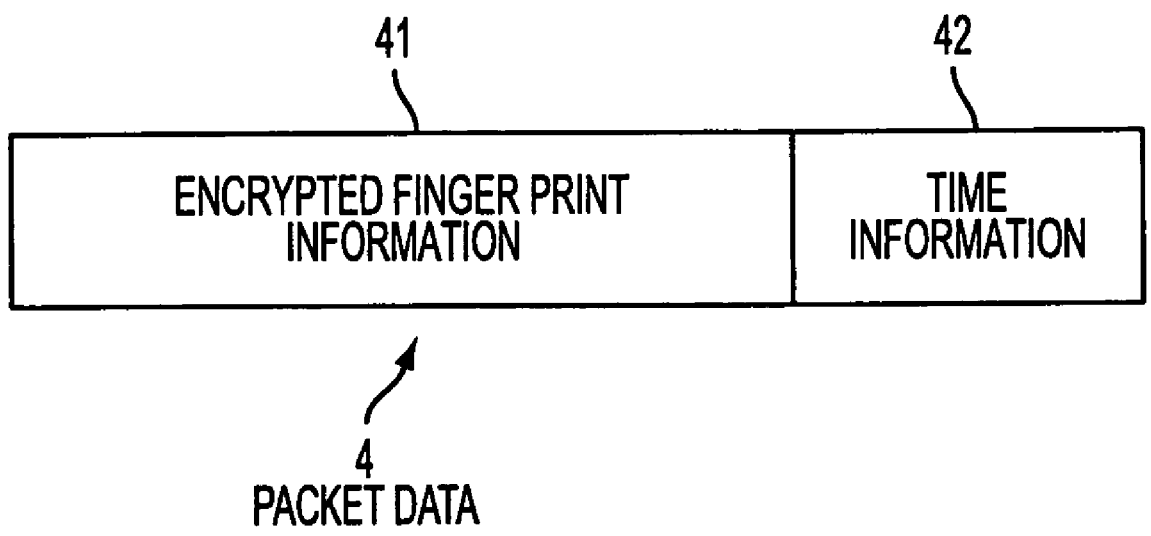
FIG. 2 shows the structure of conventional packet data.

According to the present invention, in an authentication system using anatomical information for collecting anatomical information in a form of an image and authorizing information using the image, the alteration of anatomical information by a third party who illegally wants to be authenticated can be prevented by using an authentication device using anatomical information which is characterized in authorizing information using both anatomical information generated based on the collected image and identification information which can specify the anatomical information, and thereby a system which can implement high security against impersonation can be provided.

The present invention relates to a technology for authentication using anatomical information, such as finger print information, voice information, etc., and aims to implement high security against a third party who illegally wants to be authenticated, using information obtained by encrypting the anatomical information and information which can specify the anatomical information.

FIG. 3 shows the structure of collation information used in the first preferred embodiment of the present invention.

In FIG. 3, collation information 50 comprises identification information 51 and anatomical information 52. The anatomical information 52, for example, is feature information included in a finger print image, etc. The identification information 51 is information which can specify the anatomical information 52. For the identification information 51, for example, the description or serial number of equipment by which anatomical information is collected or information which can specify a transfer route from the equipment to an authentication server, is used. The identification information 51 and anatomical information 52 are combined and are both encrypted. In this way, the identification information 51 is prevented from being easily separated from the collation information 50. As the identification information 51, information that cannot be easily judged to be correctly discovered when a third party illegally tries to decipher the identification information 51, is used.

FIG. 4 is a flowchart showing the generation procedure of collation information in the first preferred embodiment.

First, in step S1, anatomical information is obtained. For example, a user who wants to be authenticated presses his/her finger on a sensor. Then, in step S2, identification information is generated. As described earlier, it is preferable to use information which is specific to the equipment used and has no relation to a user input, such as the serial number of equipment by which the anatomical information is obtained, for identification information. Then, in step S3, collation information is generated by encrypting both the anatomical information and identification information. In this case, although the anatomical information and identification information can be encrypted using the same encryption key, it is effective to encrypt the anatomical information and identification information using different encryption keys.

Figure 5:
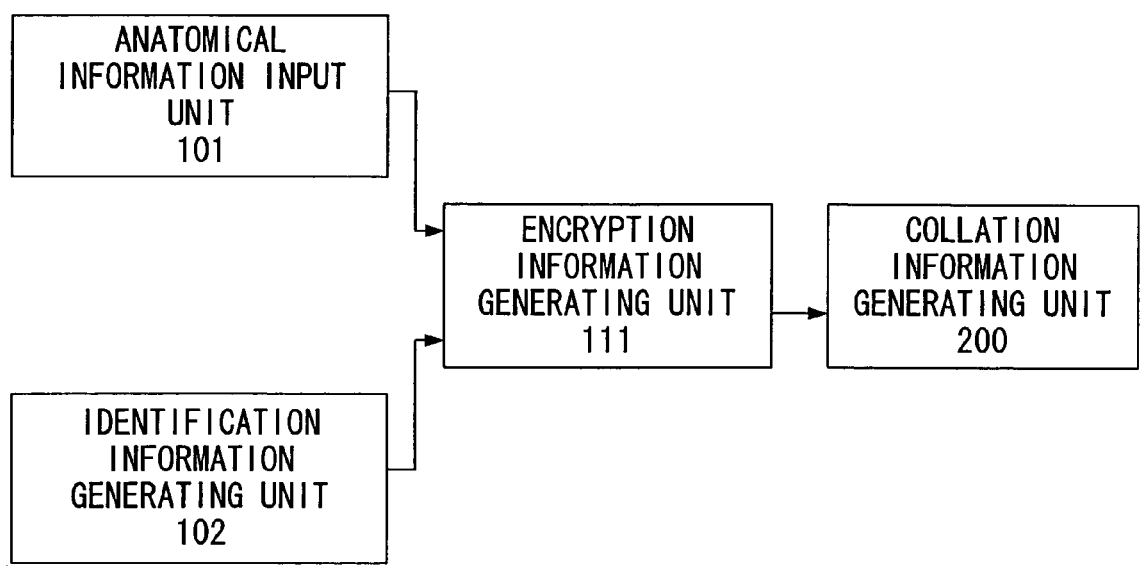
FIG. 5 shows an equipment configuration for implementing the first preferred embodiment.

FIG. 5 shows the equipment configuration for implementing the first preferred embodiment.

A anatomical information input unit 101 collects anatomical information, such as a finger print, etc., from a sensor. For example, the anatomical information input unit 101 comprises a camera, an image processing device and a device for extracting anatomical information, such as the feature information of a finger print, etc., from a visually processed anatomical image. An identification information generating unit 102 generates identification information. It is preferable to use a variety of information described earlier, for the identification information. The identification information is encrypted together with the anatomical information in an encryption information generating unit 111 and the identification information and anatomical information are combined into collation information in a collation information generating unit 200.

Figure 6:
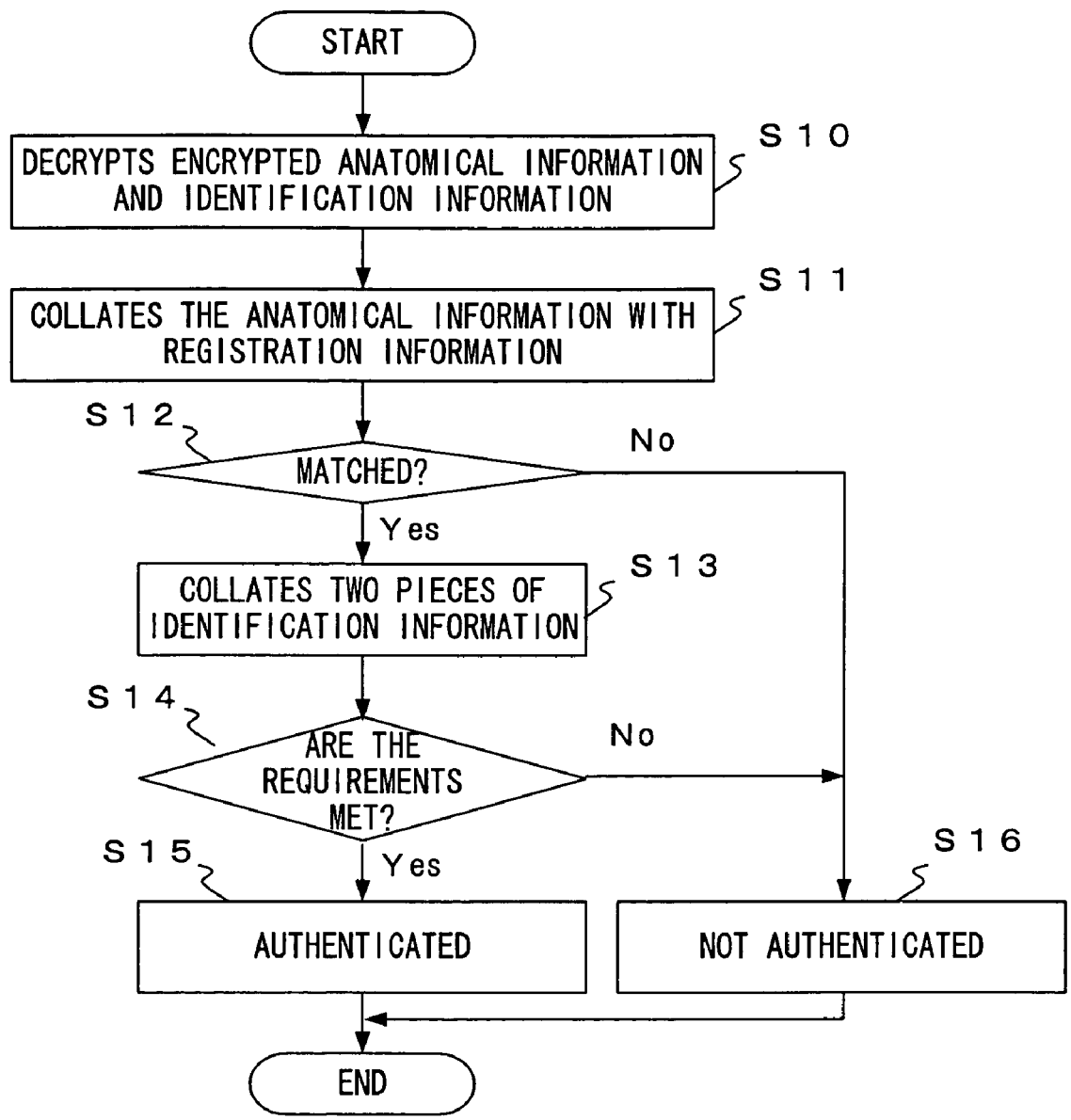
FIG. 6 is a flowchart showing an authentication procedure using collation information generated in the procedure shown in FIG. 4.

FIG. 6 is a flowchart showing an authentication procedure using collation information generated under the procedure shown in FIG. 4.

First, in step S10, the encrypted anatomical information and identification information are decrypted. Then, in step S11 the anatomical information is collated with registration information, and in step S12 it is judged whether both pieces of the information match. If both pieces of the information do not match, the flows proceeds to step S16, it is determined that the user should not be authenticated and the process is terminated. If in step S12 it is judged that the transmitted anatomical information and registration information match, the flow proceeds to step S13 and the identification information is collated. A database in which the serial number of equipment allowed to be used, etc., is registered in advance, is used to collate the identification information. Collation is sequentially performed by reading a registration content from the database and collating each registration content with the respective received identification information. Alternatively, it is judged whether a pre-determined result can be obtained by performing a pre-determined operation for the identification information, etc. In step S14 it is judged whether prescribed requirements are met. Specifically, in the case of collation by the serial numbers of equipment, it is judged that the anatomical information has been collected from legal equipment. In the case of the calculation, it is judged whether the pre-determined result has been obtained. If it is judged that the prescribed requirements are met, in step S15 it is determined to authenticate the information and the process is terminated. If in step S14 it is judged that the prescribed requirements are not met, the flow proceeds to step S16 and it is determined not to authenticate the information and the process is terminated.

Figure 7:
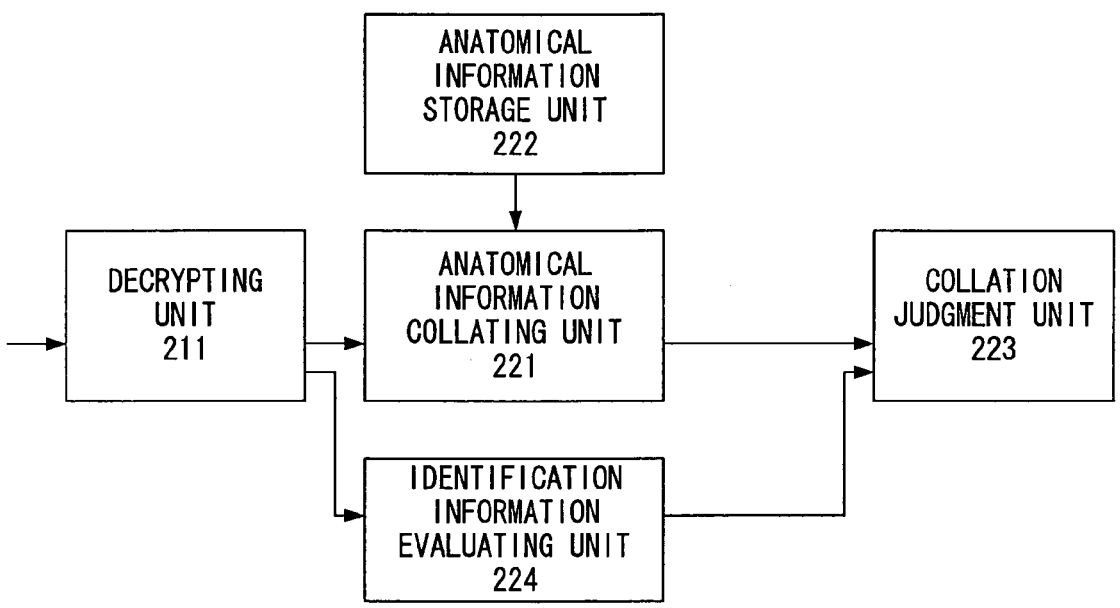
FIG. 7 shows the configuration of an apparatus for performing the process shown in FIG. 6.

FIG. 7 shows the configuration of an apparatus for performing the process shown in FIG. 6.

In a decrypting unit 211, the encrypted collation information is divided into decrypted anatomical information and decrypted identification information. In an anatomical information collating unit 221, the separated anatomical information is collated with information registered in advance in an anatomical information storage unit 222, and it is judged whether the anatomical information and registration information match. As for the identification information, it is judged whether the content satisfies a pre-determined tolerance in an identification information evaluating unit 224. To satisfy a pre-determined tolerance means, for example, what has been described with reference to step S14. In a collation judgment unit 223 it is judged whether the result of the collation by anatomical information in the anatomical information collating unit 221 and the result of the evaluation by identification information in the identification information evaluating unit 224 both meet the requirements. If the requirements are met, the collation information is authenticated and the target user is allowed to legally use collation information. To be allowed to legally use collation information means to be granted a right to use a computer, etc. Especially, the computer is unlocked.

According to this preferred embodiment, since identification information is authenticated in addition to anatomical information, security is improved. Furthermore, since both anatomical information and identification information are encrypted, it is difficult for a third party to decipher collation information or to replace the collation information with new collation information. A possibility that time information, which is not encrypted, may be replaced like the prior art can also be reduced.

FIG. 8 shows the structure of collation information in the second preferred embodiment of the present invention.

In the second preferred embodiment, additional information (DD: digest data) 57 is included in collation information 55 for verifying identification information 56 in addition to the identification information 56 by which the collection time of or equipment used to collect the anatomical information 58 shown in FIG. 3 can be specified. In FIG. 8, both the additional information 57 and anatomical information 58 are encrypted. The additional information 57 and identification information 56 have the following relationships and the identification information 56 can be verified by using the identification information 57.

$$A = F(DD)$$

Where
  A: Identification information
  F: Pre-defined mapping

In this case, first, identification information A is determined and then DD is obtained using an inverted map $F^{-1}$. Conversely, first, DD can be determined and then identification information A can be obtained using a map F.

The additional information 57 and anatomical information 58 of the collation information 55 to be used for collation are both encrypted in such a way that the following equation can be established.

$$I = H(B)$$

Where
  I: Collation information
  B: Information composed of additional information and anatomical information If the configuration of this preferred embodiment is adopted, impersonation by a third party can be detected by verifying identification information A even if encrypted collation information I is replaced with the information of another user. As a result, higher security against illegal authentication than that obtained by the conventional method can be implemented.

In this preferred embodiment, collation information, the alteration of which can be detected, can be generated by generating additional information which can specify identification information in addition to the identification information for specifying collected anatomical information and using the additional information together with the anatomical information.

In this preferred embodiment, the collection time can be specified by using the collection time as identification information. If the collection time is used as identification information, there is a possibility that identification information can be separated from collation information and can be replaced with another piece of information. However, since the identification information can be verified by using additional information, it can be judged whether the identification has been replaced with another piece of information.

In a communications system using a variable-length packet, a new piece of identification information can also be added every time data pass through different equipment in a network.

Alternatively, order information for specifying the order in which anatomical information is collected in specific equipment can be used as identification information. In this case, if anatomical information is not received from specific equipment in the order indicated by the order information, it can be judged that there is a failure in the transmission line or the transmission line is being tapped.

Information about a route taken between an obtaining device and an authentication device in which anatomical information is collected, can also be used as identification information.

FIG. 9 is a flowchart showing the process procedure in the third preferred embodiment of the present invention.

First, in step S20, anatomical information is collected. In step S21, identification information is generated. When the anatomical information is collected in step S20, the collection time or collection date indicating when anatomical information is collected, the serial number of equipment by which anatomical information is collected, counter information, etc., are obtained and used as identification information. Then, in step S22, additional information is generated. As described with reference to the second preferred embodiment, the additional information is generated using the inverted map of a map provided as additional information at the time of collation in such a way that the map of the additional information becomes identification information. Then, in step S23, encryption information is generated by encrypting both the additional information and anatomical information. In step S24, the encryption information and identification information are combined into collation information.

FIG. 10 shows the equipment configuration for generating collation information in the third preferred embodiment.

According to an instruction from a control unit, which is not shown in FIG. 10, the anatomical information input unit 101 collects anatomical information, such as finger print information, voice print information, iris information, etc., and information to be used to collate is generated by feature extraction, etc. This process is the same as that performed in the conventional case. In parallel to the input process of the anatomical information input unit 101, the identification information generating unit 102 generates information which can specify the collection time, a collection place or equipment by which anatomical information is collected, such as collection time, the serial number of collected information, etc., according to an instruction from a control unit, which is not shown in FIG. 10. The additional information generating unit 103 generates additional information which can verify the identification information. The identification information can also be used without additional information. An encryption information generating unit 111 encrypts both the feature information from the anatomical information input unit 101 and additional information from the additional information generating unit 103.

The information encrypted in the encryption information generating unit 111 is combined into collation information together with the identification information generated by the identification information generating unit 102 in a collation information generating unit 200.

Figure 11:
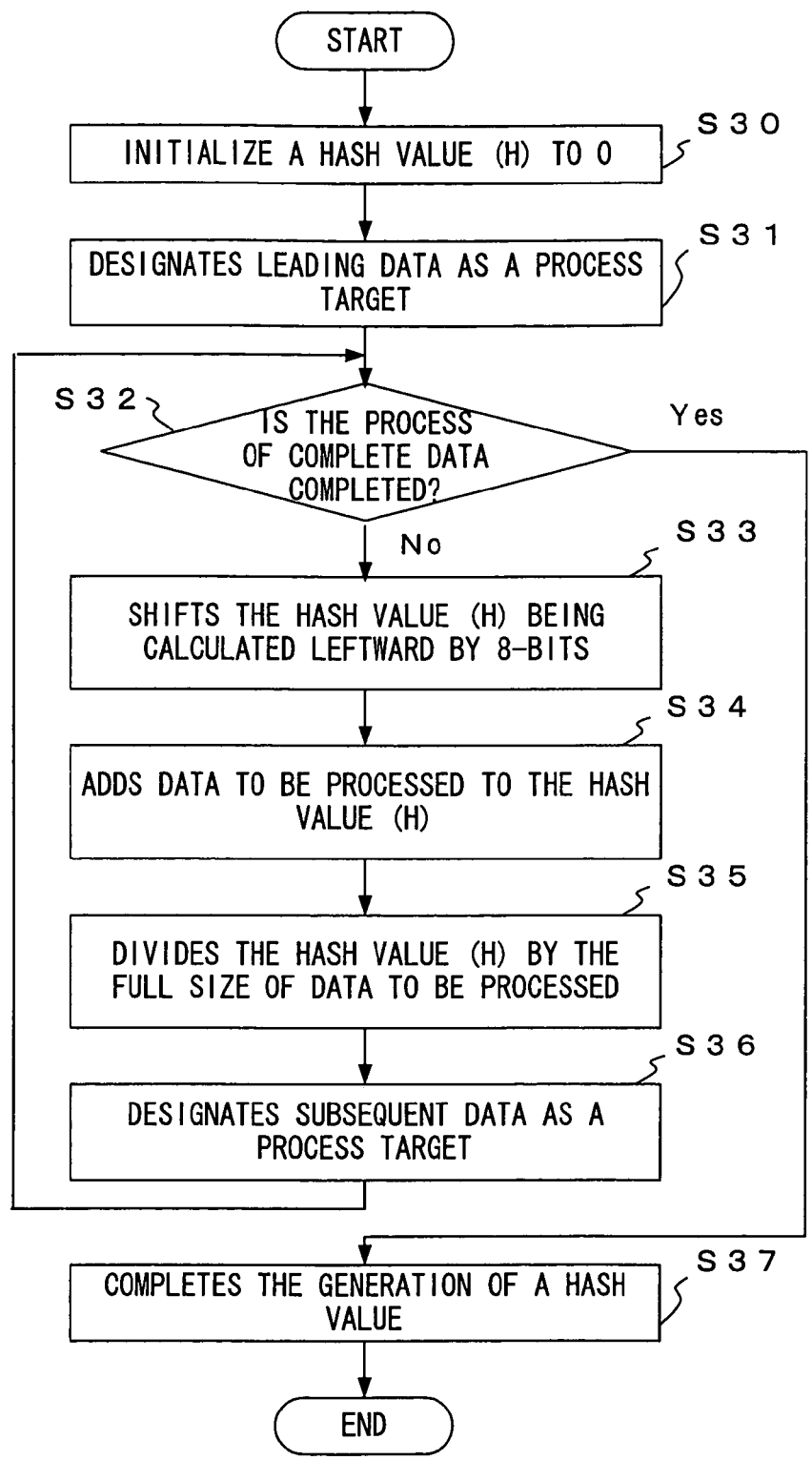
FIG. 11 is a flowchart showing an example of the generation procedure of additional information.

FIG. 11 is a flowchart showing an example of the generation procedure of additional information.

FIG. 11 does not limit the additional information generating method of this preferred embodiment to this method. For example, a general hash method, such as MD5, SHA, etc., can also be used.

First, in step S30, a hash value (H) is initialized to "0". Then, in step S31, leading data is set as a process target. In step S32, it is judged whether the process of complete data is completed. If it is judged that the process of complete data is not completed yet, in step S33 the calculated hash value (H) is shifted leftward by eight bits. Then, in step S34, data to be processed is added to the hash value (H). Then, in step S35, the hash value (H) is divided by the complete data size to be processed. Then, in step S36, subsequent data is set as a process target and the flow returns to step S32. If in step S32 it is judged that the process of complete data is completed, in step S37 a final hash value (H) is calculated, it is judged that the generation of additional information is completed and the process is terminated.

FIG. 12 is a flowchart showing the collation procedure in the third preferred embodiment.

In step S40 received collation information is divided into encryption information and identification information, in step S41 the encrypted information is decrypted and divided into anatomical information and additional information. In step S42, the anatomical information is collated with information registered in advance, and in step S43 it is judged whether the anatomical information and registration information match. If in step S43 it is judged that the anatomical information and registration information do not match, in step S47 it is determined not to authenticate the anatomical information and the process is terminated. If in step S43 it is judged that the anatomical information and registration information match, in step S44 information for verifying identification information is generated based on the additional information. For example, verification information is generated by performing a pre-determined mapping for the additional information. If the additional information is generated by the process shown in FIG. 11, verification information is generated by a process that is the reverse of the process shown in FIG. 11.

In step S45, the generated verification information is collated with the identification information separated from the collation information, and the identification information is verified. If the and the identification information is verified by the verification information, in step S46 the user is authenticated to be a legal user. If the identification information is not verified, in step S47 it is determined not to authenticate the collation information and the process is terminated.

In the third preferred embodiment, what is finally notified to a user who inputs anatomical information is a result indicating whether the user is authenticated to be a legal user. In order to succeed in impersonation, deciphering both encrypted information and a verification information generating method based on additional information is required. Therefore, only information about whether a user is authenticated is not sufficient to decipher collation information. Accordingly, security can be greatly improved compared with the conventional method.

Figure 13:
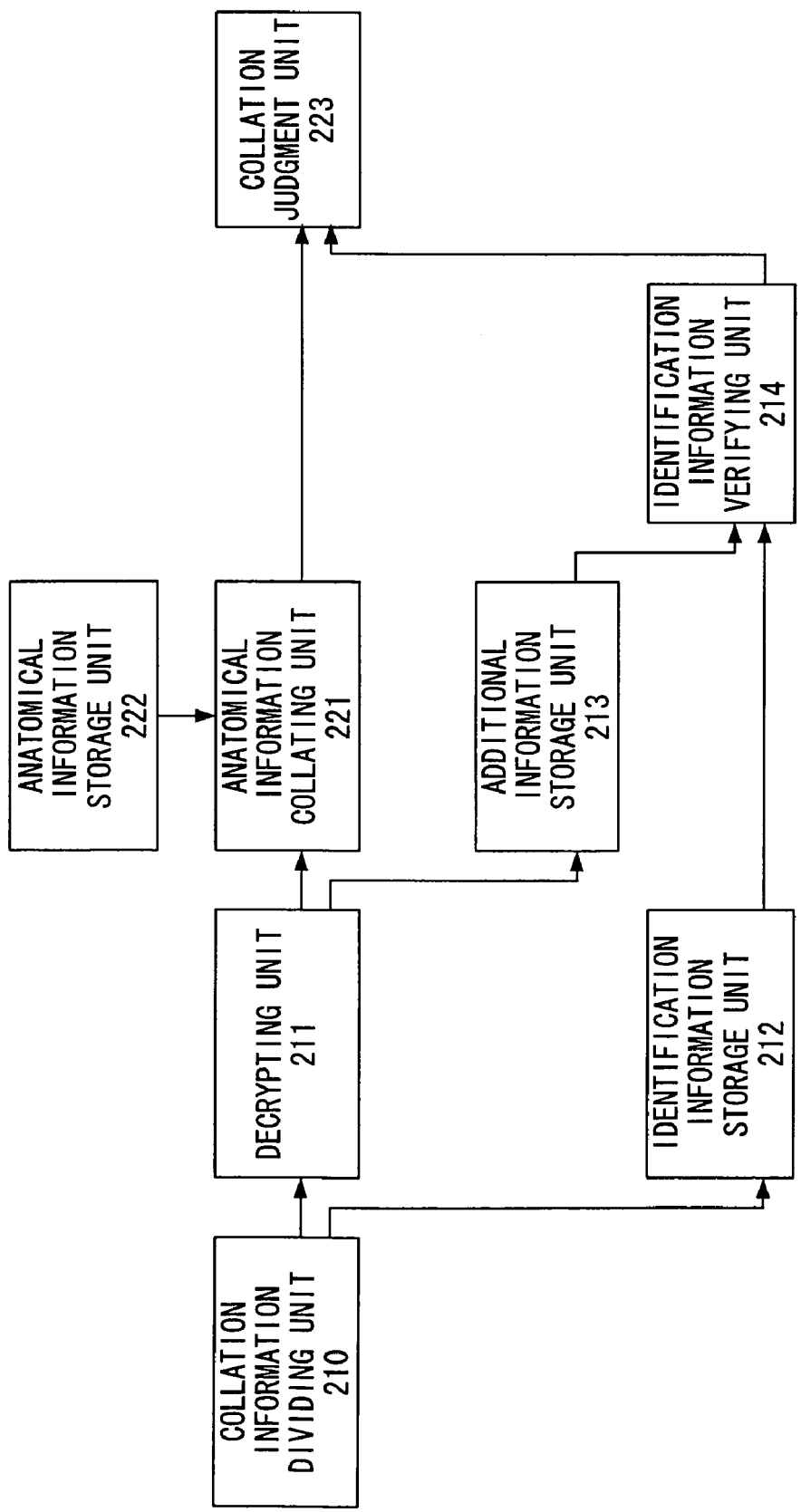
FIG. 13 shows the configuration of the collation unit in the third preferred embodiment.

FIG. 13 shows the configuration of a collation unit in the third preferred embodiment.

Collation information is divided into encryption information composed of anatomical information and additional information, and identification information in a collation information dividing unit 201. After the encryption information is decrypted in a decrypting unit 211, in an anatomical information collating unit 221, the anatomical information is collated with anatomical information stored in advance in a anatomical information storage unit 222, and the result is sent to a collation judgment unit 222. After being stored in an additional information storage unit 213, the additional information is used to verify the identification information stored in the identification information storage unit 212 in an identification information verifying unit 214. The collation judgment unit 223 is notified of the verification result by the identification information verifying unit 214. Only when the respective notification by the anatomical information collating unit 221 and identification information verifying unit 214 are both "to be authenticated", the user is authenticated to be a legal user as a result.

Figure 14:
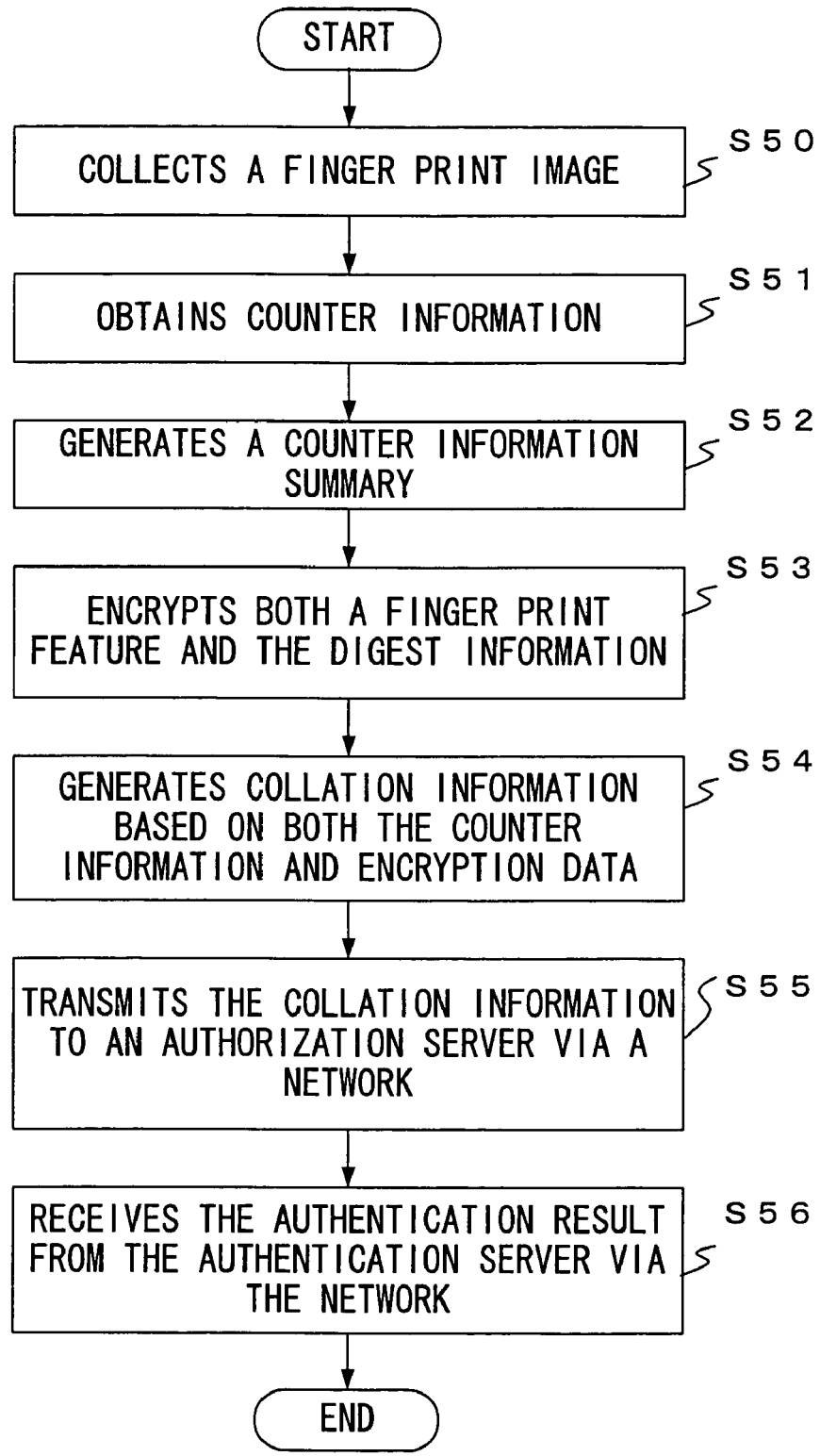
FIG. 14 is a flowchart showing a collation information generating procedure in the fourth preferred embodiment of the present invention.

FIG. 14 is a flowchart showing a collation information generating procedure in the fourth preferred embodiment of the present invention.

In the fourth preferred embodiment, counter information built into equipment which is obtained at the time of finger print collection, is obtained and is used as identification information. Then, digest information (additional information) is generated based on the counter information obtained at the time of finger print collection. After being encrypted, both anatomical information obtained by extracting a feature from a collected finger print image and the digest information are transmitted to an authentication server on a network via a communications unit together with identification information comprised of the collection counter information. Then, the authentication result is received in the communications unit from the authentication server via the network and a series of authentication processes are terminated.

First, in a collation information generating procedure, in step S50, a finger print is collected. Then, in step S51, counter information, which is a counter value obtained when a finger print image is collected, is obtained. In step S52 digest information is generated based on the counter information, and in step S53 the finger print feature and digest information are encrypted. Then, in step S54, collation information is generated based on both the counter information and encryption data. In step S55 the collation information is transmitted to an authentication server via a network, and in step S56 the authentication result of the authentication server is received via the network.

Figure 15:
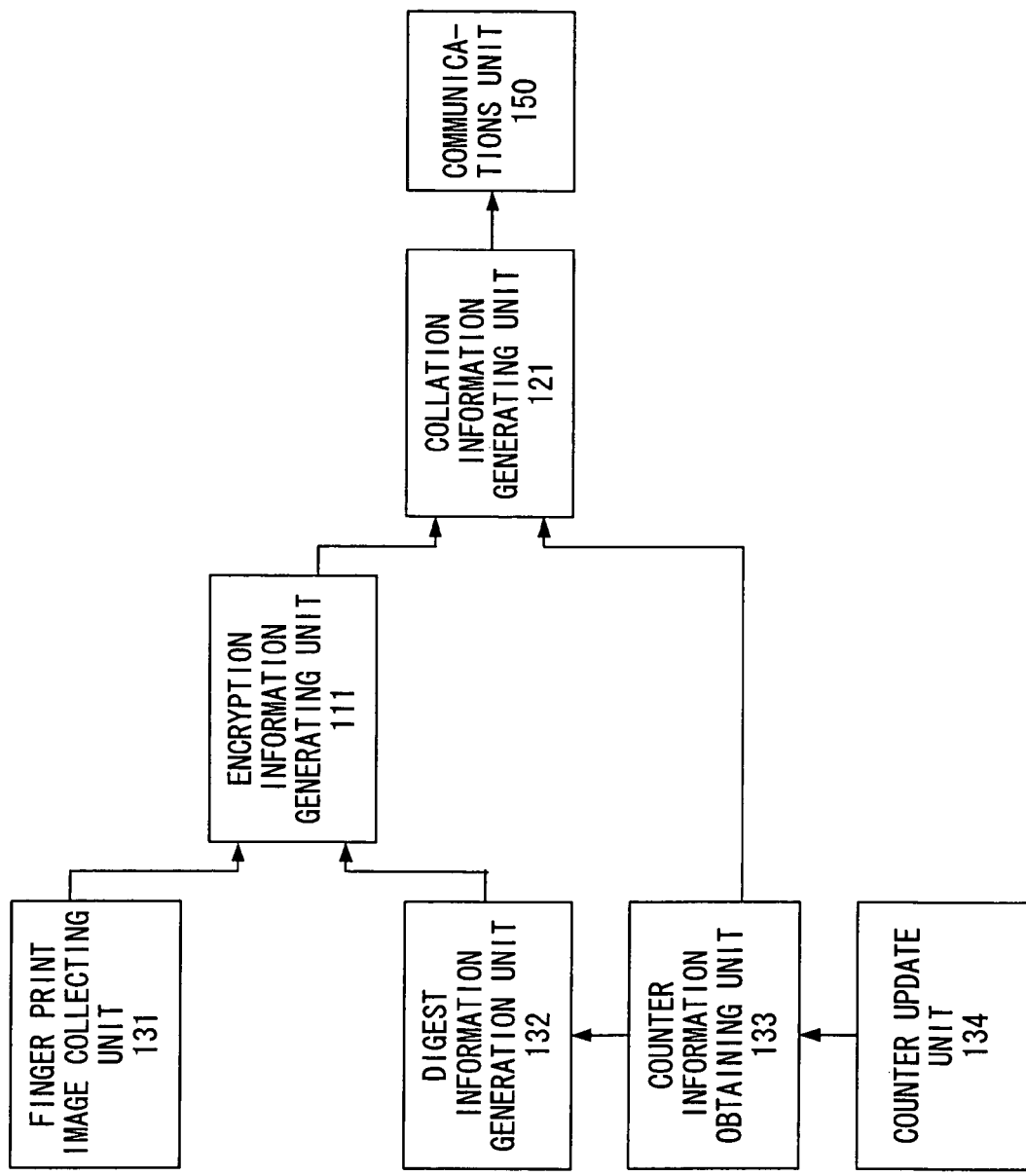
FIG. 15 shows the configuration of a terminal device for generating collation information in the fourth preferred embodiment.

FIG. 15 shows the configuration of a terminal device for generating collation information in the fourth preferred embodiment.

In a finger print collecting unit 131, a finger print image is collected and feature information is extracted. According to an instruction from a control unit, which is not shown in FIG. 15, the counter information of a counter update unit 134, which is obtained at the time of finger print collection, is recorded in a counter information obtaining unit 133, and verification information is generated in a digest generation unit 132. Both the generated digest information and the feature information extracted by the finger print image collecting unit 111 are encrypted. The collection counter information recorded in the counter information obtaining unit 133 is combined with encryption information from the encryption information generating unit 111 in a collation information generating unit 212 into identification information and is transmitted to an authentication server via both a communications unit 150 and a network, which is not shown in FIG. 15. The collation result of the authentication server is received in the communications unit 150.

Figure 16:
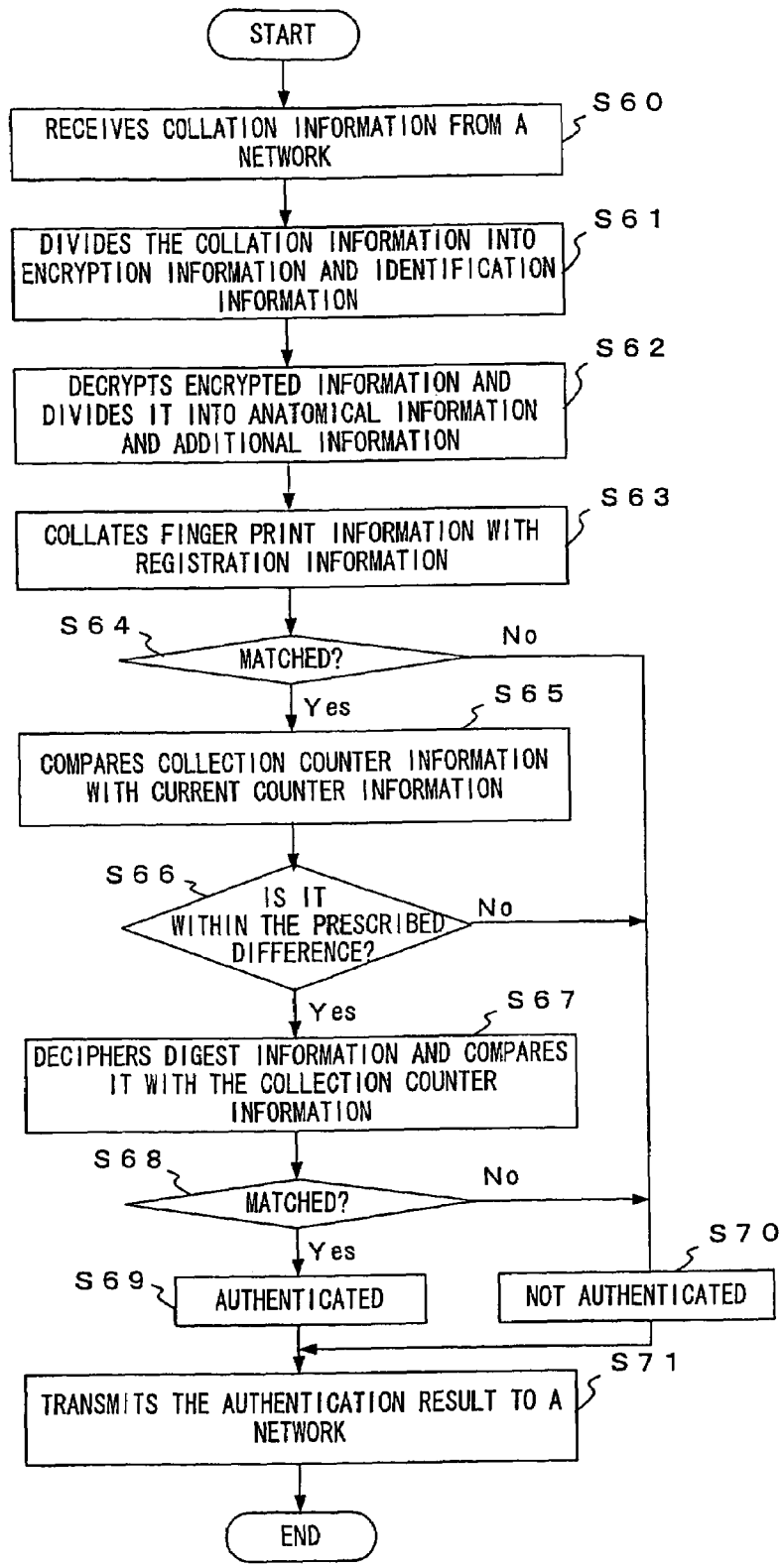
FIG. 16 is a flowchart showing a collation procedure in the fourth preferred embodiment.

FIG. 16 is a flowchart showing a collation procedure in the fourth preferred embodiment.

In the authentication server, after, in step S60, the communications unit receives collation information, in step S61 the collation information is divided into encryption information and identification information. In step S62, the encryption information is decrypted and divided into anatomical information (finger print feature information) and digest information for verifying counter information. In step S63, the finger print feature information is collated with information registered in advance. In step S64, it is judged whether the feature information and registration information match. If the feature information and registration information do not match, in step S70 it is determined not to authenticate the anatomical information, and in step S71 this determination is transmitted to the network. If in step S64 the feature information and registration information match, in step S65 counter information obtained at the time of collection and current counter information are compared. If in step S66 the counter comparison result is within a prescribed time difference, the counter information separated as identification information at the time of collection is verified using the digest information (step S67). If in step S68 the digest information and collection counter information are compared and it is judged that the digest information and counter information do not match, the flow proceeds to step S70 and in step S70 it is determined not to authenticate the anatomical information and the result is transmitted to the network (step S71). If in step S68 it is confirmed that the digest information and counter information match, in step S69 it is determined to authenticate the anatomical information and the authentication is transmitted from the communications unit (step S71).

FIG. 17 shows the configuration of a collation unit in the fourth preferred embodiment.

A counter measurement unit 232 and a collection counter information comparing unit 237 are further comprised compared with the configuration shown in FIG. 13.

On receipt of collation information, a communications unit 250 inputs the collation information to a collation information dividing unit 201. The collation information dividing unit 201 divides the collation information into encryption information and counter information. The encryption information is decrypted in a decrypting unit 211 and is divided into anatomical information and digest information. Then, in an anatomical information collating unit 234, the anatomical information is collated with registration information stored in an anatomical information storage unit 233, and the result is transmitted to a collation judgment unit 238. The digest information is inputted to a digest decrypting unit 235, and counter information is obtained from the digest information by mapping.

After being temporarily stored in a collection counter information storage unit 231, the collection counter information separated by the collation information dividing unit 201 is compared with a counter value obtained in the digest decrypting unit 235 in a digest comparison unit 236, and the result is inputted to the collation judgment unit 238. In the collection counter information comparing unit 237, the collection counter information is compared with the counter value of the counter measurement unit 232, it is judged whether the difference between the collection counter information and counter value is within a prescribed range and the collection counter information is inputted to the collation judgment unit 238.

If the anatomical information matches the registration information, the collection counter information of the digest information matches the counter value of the digest decrypting unit 235 and the difference between the collection counter information and the counter value of the counter measurement unit 232 is less than a specific value, the collation judgment unit 238 judges that the collation information is verified.

The preferred embodiment shown in FIG. 15 shows a case where a built-in counter is used. In this case, there are the following methods for ensuring the matching of counter information between equipment. Specifically, the initial value is fixed by converting the time difference between time information obtained when software to be installed in each piece of equipment is produced and the time information of each piece of equipment, to the scale of a used counter when the counter is installed. Then, the counter of each piece of equipment is counted up at prescribed time intervals (using a time range allowed in authentication as units). In this way, the matching of counter values between equipment can be ensured.

The system can also be configured in such a way that a counter is not built into each piece of equipment and common counter information can be obtained from a device installed on the network via a communications line.

Figure 18:
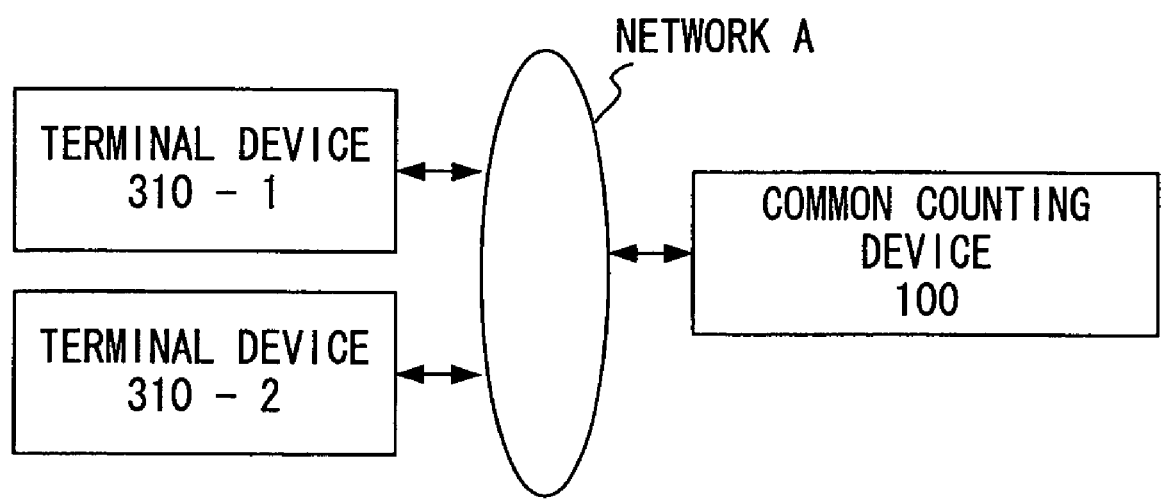
FIG. 18 shows the basic configuration of a preferred embodiment where a terminal device obtains common counter information via a communications network.

FIG. 18 shows the basic configuration of a preferred embodiment in which each terminal device obtains common counter information via a communications line.

One of terminal devices 310-1 and 310-2 is an anatomical information collecting device and the other is a collation device for collating information using anatomical information, such as a finger print, etc. A common counter device 100 supplies a counter value which the terminal devices 310-1 and 310-2 share. For example, if the terminal 310-1 is assumed to be an anatomical information collecting device, the terminal device 310-1 collects anatomical information, and when generating collation information, it obtains a counter value from the common counter device 100 via a network A and generates the counter information of the collation information. The collation information transmitted from the terminal device 310-1 is transmitted to the terminal device 310-2 via the network A. In the terminal device 310-2, the received collation information is processed in the same way as in the fourth preferred embodiment and counter information is collated. Although in the fourth preferred embodiment, a counter value is obtained using a built-in counter synchronized with the transmitting side and the counter values are compared, in the fifth preferred embodiment, a counter value is obtained from the common counter device 100 via network A and the counter value is compared with a counter value included in the collation information.

Therefore, there is no need to synchronize a counter on the transmitting side with a counter on the receiving side, unlike a case where a built-in counter is used, and thereby equipment configuration can be simplified.

FIG. 19 shows a data structure used in the fifth preferred embodiment.

The data of the fifth preferred embodiment comprise information about routes taken from where finger print data (anatomical information) are collected and to where the finger print data are authenticated.

Specifically, when transmitting collation information, as shown in (1), a transmitting device generates both finger print data, which are anatomical information, and additional information (criterion information) a0, which is generated on the basis of the finger print data, and encrypts and transmits both pieces of data as one packet. Then, when this collation information passes through a relay device which is installed in route 1, the relay device attaches both an identifier for specifying route 1 and additional information a1 which is generated by mapping this identifier (in this case, criterion information a0 is used) to packet (1) and transmits packet data, as shown in (2). Furthermore, when the packet (2) passes through a relay device which is installed in route 2, the relay device generates packet (3) by attaching both an identifier for specifying route 2 and additional information a2 which is generated by mapping this identifier, to packet (2) and eliminating the additional information a1 and transmits the packet.

In this way, since a relay device which is installed in a specific route of a network attaches route information to a packet every time collation information passes through the relay device, it can be judged whether the collation information has taken a normal route or incorrect route.

Figure 20:
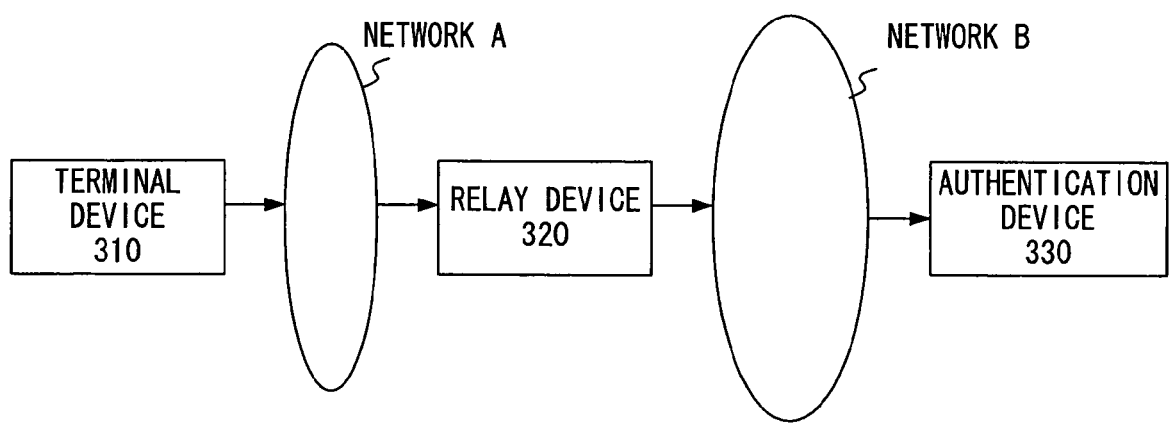
FIG. 20 shows the system configuration of the fifth preferred embodiment.

FIG. 20 shows the system configuration of the fifth preferred embodiment.

The system is configured in such a way that one or more relay devices 320 are installed between a terminal device 310 and an authentication device 330.

The terminal device 310 generates collation information based on collected anatomical information and transmits the collation information to network A. On receipt of the collation information from network A, a relay device 320 attaches the identifier or identification information of a route where the relay device 320 is installed, to the collation information, further attaches an identifier or additional information which is generated based on the identification information, to the collation information, as described with reference to FIG. 19, and transmits the collation information to a network B. On receipt of the collation information from network B, the authentication device 330 performs anatomical information collation and performs identification information collation, judges whether the identification information is altered by using the additional information and judges whether a user who wants to be authenticated using the terminal device 310 should be authenticated. The judgment result is transmitted to the terminal device 310 via network B, the relay device 320 and network A, in this order.

Since the respective generation methods of both a criterion value and additional information are the same as those described with reference to FIG. 11, the descriptions are omitted here. However, the methods described with reference to FIG. 11 are only examples and the generation methods are not limited to the methods. A general hash method, such as MD5, SHA, etc., can also be used. A criterion value is a0 shown in FIG. 19, and indicates additional information generated based on anatomical information.

FIG. 21 is a flowchart showing the process procedure of the terminal device 310 shown in FIG. 20.

First, in step S75 a finger print image is collected, and in step S76 the criterion value of the finger print data is calculated. Then, in step S77, collation information is generated by encrypting both the finger print data and the criterion values of the finger print data. Then, in step S78, the collation information is transmitted to a relay device via a network.

Although in this example, the description has been given using finger print data as anatomical information, the processes described above are also applicable to general anatomical information.

Figure 22:
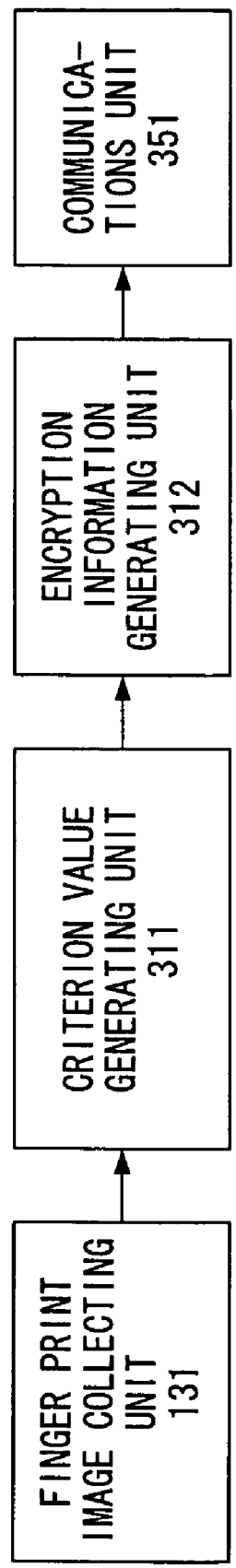
FIG. 22 shows the equipment configuration of the terminal device 310.

FIG. 22 shows the equipment configuration of a terminal device 310.

In the terminal device 310, a finger print image collecting unit 131 collects a finger print image and extracts finger print information. Then, a criterion value generating unit 311 calculates a one-direction mapping value, which becomes a criterion value at the time of authentication by the authentication device 330, based on the collection finger print information. After encrypting both the one-direction mapping value and collection finger print information, an encryption information generating unit 312 transmits the encrypted one-direction mapping value and collection finger print information to a relay device on a network via a communications unit 351. The criterion value is generated according to the following equation and is encrypted.

a0=$H_o$ (Finger print data)

Figure 23:
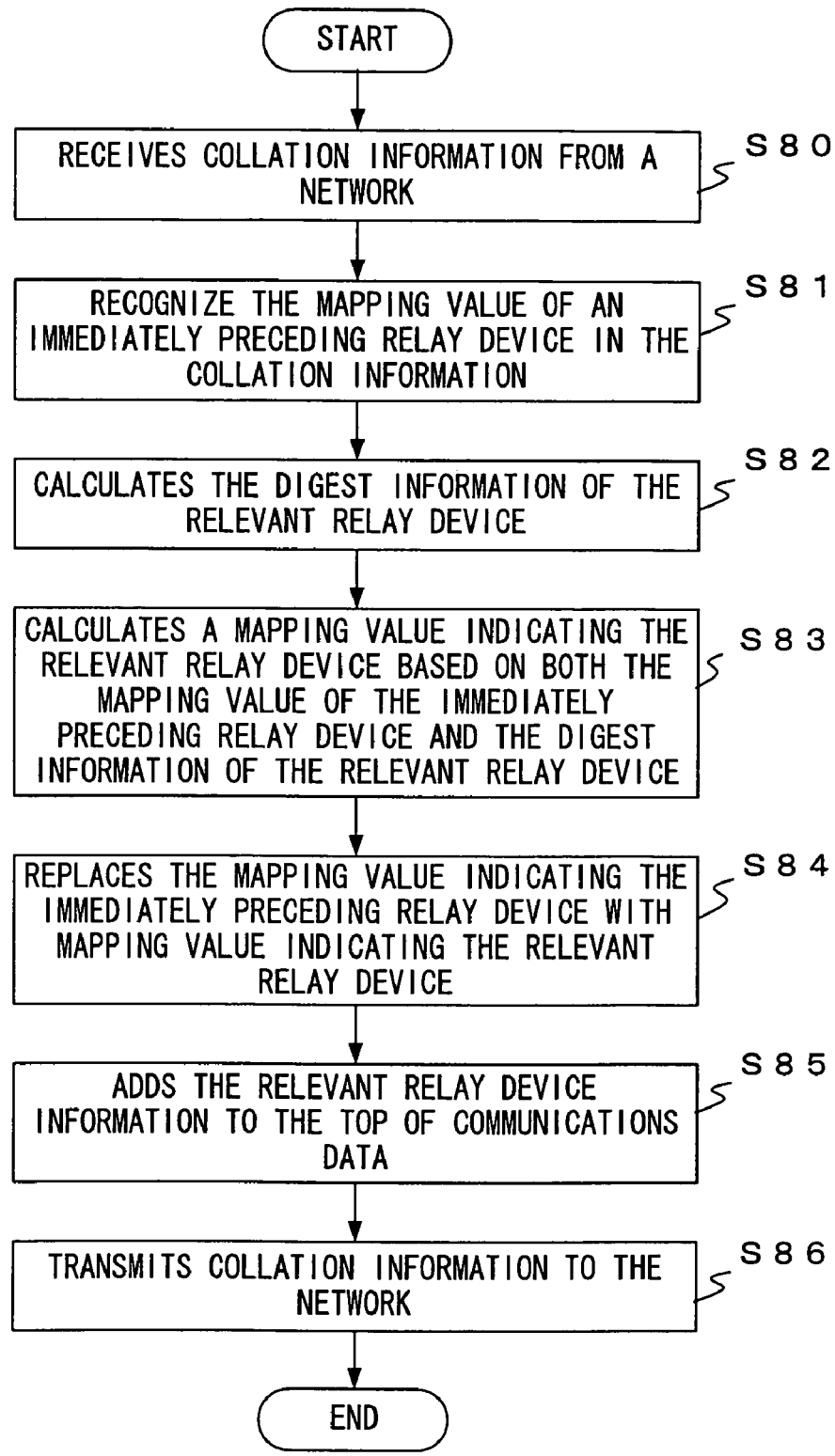
FIG. 23 is a flowchart showing the process procedure of a relay device 320.

FIG. 23 is a flowchart showing the process procedure of a relay device 320.

First, in step S80, the relay device 320 receives collation information from a network. Then, in step S81, the relay device 320 recognizes the mapping value of an immediately preceding relay device in the collation information. Then, in step S82, the relay device 320 calculates the digest information of the relevant relay device. Then, in step S83, the relay device 320 calculates a mapping value indicating the relevant relay device based on both the mapping value of the immediately preceding relay device and the digest information of the relevant relay device. In step S84, the relay device 320 replaces the mapping value of the immediately preceding relay device with the mapping value of the relevant relay device. In step S85 the relay device 320 attaches the information of the relevant relay device to the front of the communications data. In step S86, the relay device 320 transmits the collation information to the network.

Figure 24:
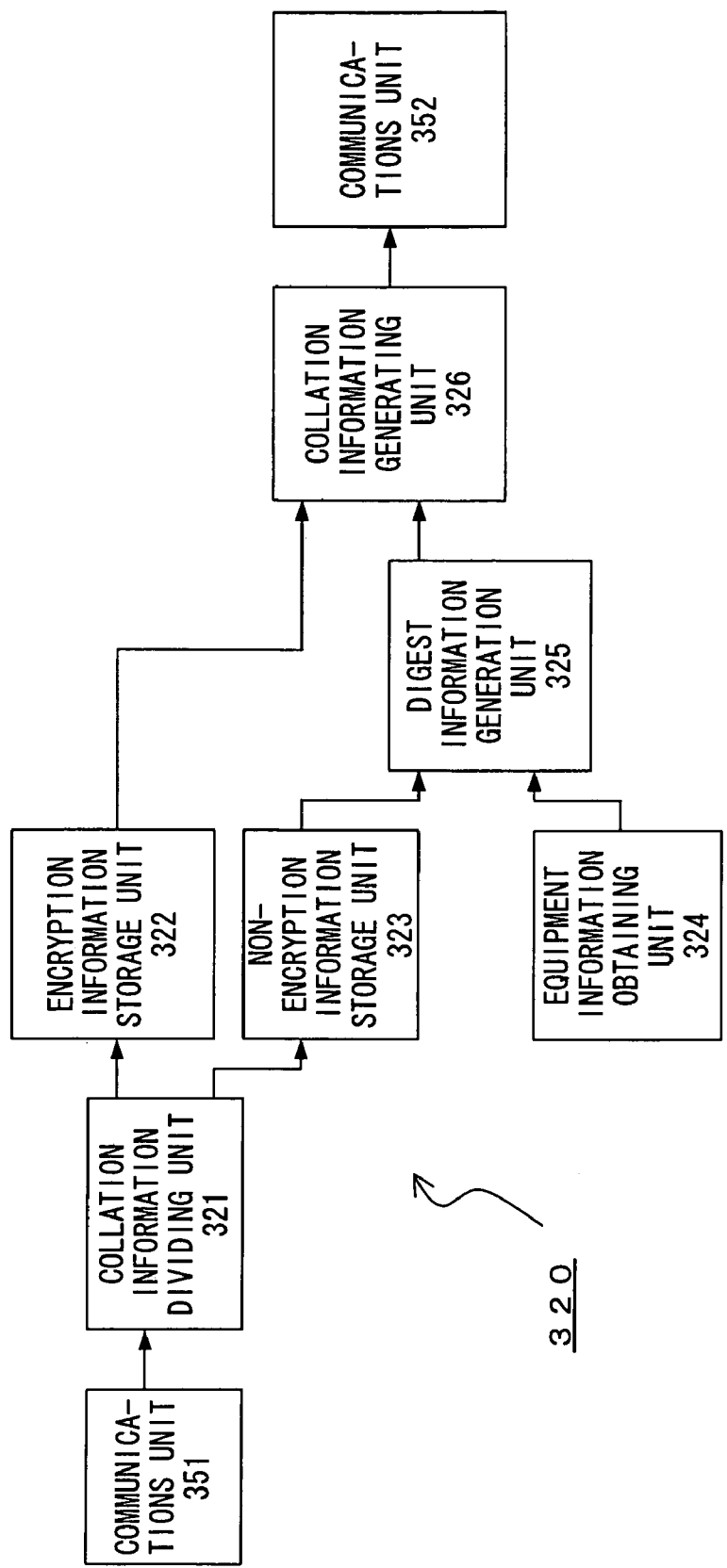
FIG. 24 shows the equipment configuration of the relay device 320.

FIG. 24 shows the equipment configuration of the relay device 320.

In the fifth preferred embodiment, data are prevented from being replaced during transmission over a network by attaching information which can specify a relay device 320, to finger print data when the finger print data passes through the relay device 320. Additional information is generated according to the following equation and is attached to the finger print data as a non-encrypted section together with repeater identification information.

a1=$H_{a0}$ (D(route 1))

a2=$H_{a1}$ (D(route 2))

•

•

• an=$H_{a(n-1)}$ (D(route n))

Information indicated by route n is information for specifying a relay device 320, and corresponds to the IP address information of a network. Furthermore, time information about when finger print data reach the relay device 320 is obtained and designated as information route n together with the IP address information. Then, both the information route and one-direction mapping value which is obtained using data a(n−1) added by an immediately preceding relay device are added as information route n and information an, respectively.

On receipt of collation information, a communications unit 351 inputs the collation information to a collation information dividing unit 321. The collation information dividing unit 321 divides the received collation information into encrypted data and non-encrypted data, and inputs the encrypted data and non-encrypted data to an encryption information storage unit 322 and an non-encryption information storage unit 323, respectively. The encryption information stored in the encryption information storage unit 322 is read at an appropriate timing and is inputted to a collation information generating unit 326. After being read from the non-encryption information storage unit 323, the non-encryption information is inputted to a digest information generation unit 325. Equipment information, such as an IP address, etc., is also inputted from an equipment information obtaining unit 324 for obtaining the IP address of a relay device, etc., to the digest information generation unit 325. The digest generation unit 325 generates digest information based on both the non-encryption information and equipment information in the procedure described above and inputs the generated digest information into the collation information generating unit 326. The collation information generating unit 326 generates collation information based on both the encryption information and digest information and transmits the collation information to a network via a communications unit 352.

Figure 25:
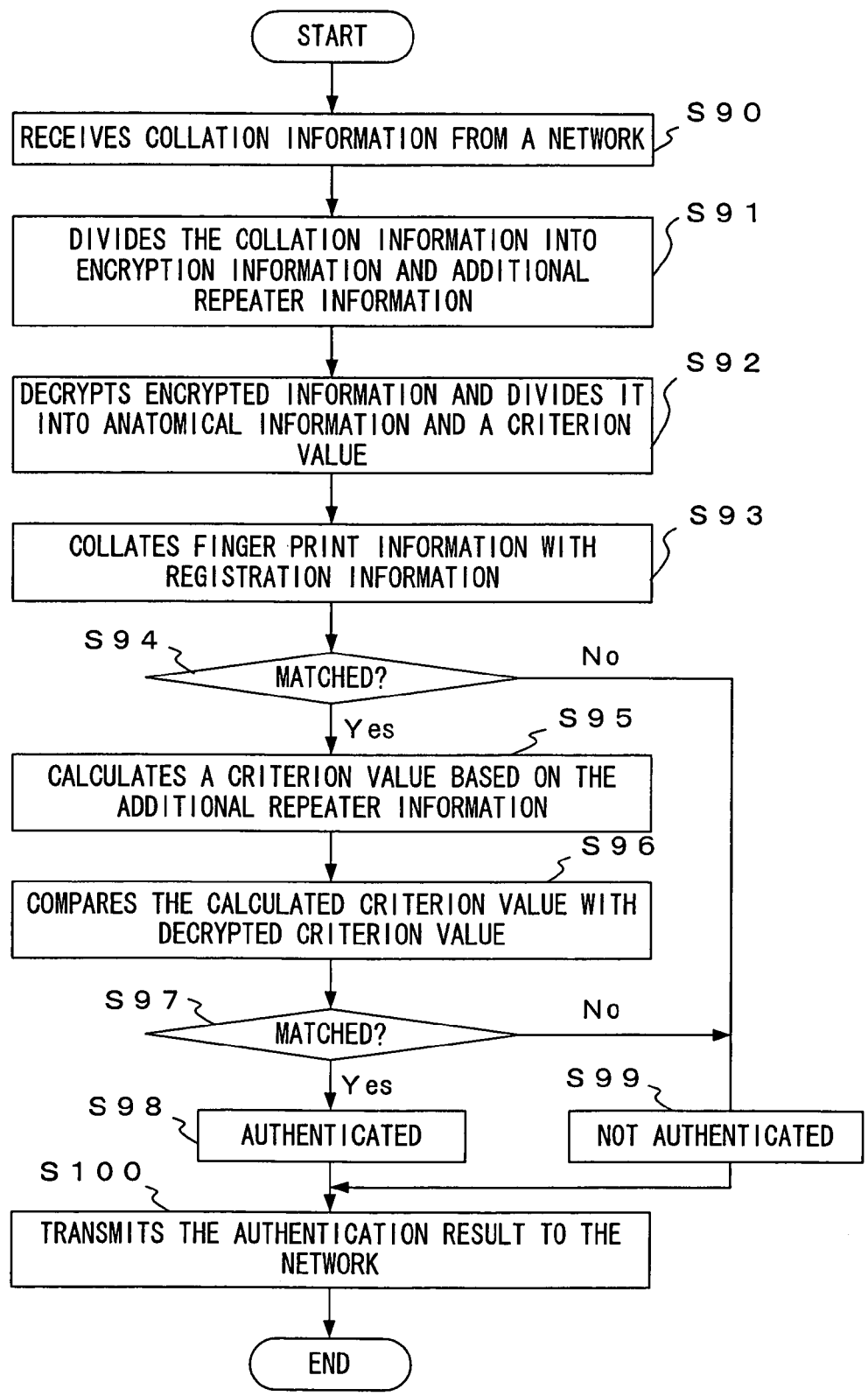
FIG. 25 is a flowchart showing the operation procedure of an authentication device 330 in the fifth preferred embodiment.

FIG. 25 is a flowchart showing the operation procedure of an authentication device 330 in the fifth preferred embodiment.

First, in step S90, the authentication device 330 receives collation information from a network. Then, in step S91, the authentication device divides additional repeater information into collation information and encryption information. In step S92, the encryption information is decrypted and is divided into anatomical information and a criterion value. In step S93, the authentication device collates finger print information with registration information. In step S94, it is judged whether the finger print information and registration information match. If it is judged that the finger print information and registration information do not match, in step S99 it is determined not to authenticate the finger print information, and in step S100 the authentication result is transmitted to the network.

If in step S94 it is judged that the finger print information and registration information match, in step S95 the authentication device calculates a criterion value based on the additional repeater information. Then, in step S96, the authentication device compares the calculated criterion value with the decrypted criterion value, and judges whether the calculated criterion value and the decrypted criterion value match. If it is judged that the calculated criterion value and the decrypted criterion value do not match, in step S99 it is determined not to authenticate the finger print information, and the authentication result is transmitted to the network. If in step S97 it is judged that the calculated criterion value and the decrypted criterion value match, in step S98 it is determined to authenticate the finger print information and the authentication result is transmitted to the network.

Although in this example the authentication device calculates a criterion value based on the additional repeater information and compares the calculated criterion value with the decrypted criterion value, the additional repeater information can also be calculated based on the decrypted criterion value by an inverted map, and the decrypted additional repeater information can also be compared with the calculated additional repeater information.

Figure 26:
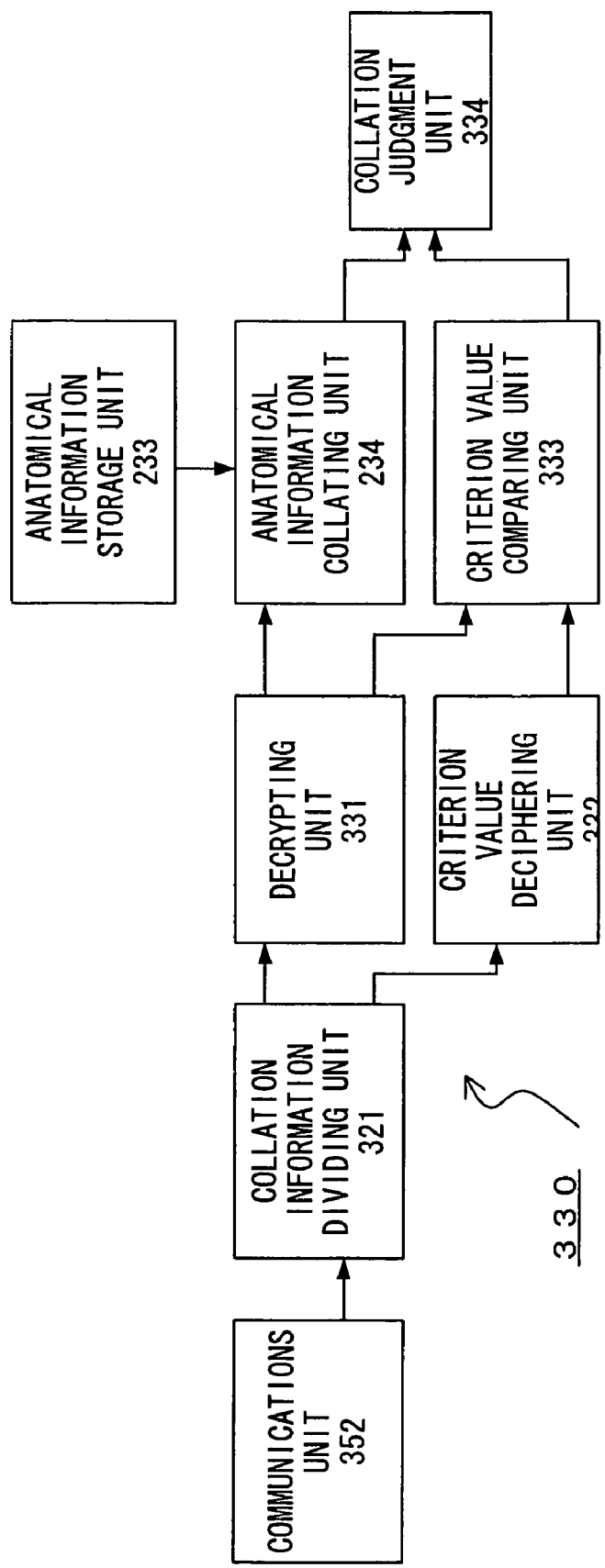
FIG. 26 shows the equipment configuration of the authentication device 330 in the fifth preferred embodiment.

FIG. 26 shows the equipment configuration of the authentication device in the fifth preferred embodiment.

In the authentication device 330, after collation information is received in a communications unit 352, a collation information dividing unit 321 divides the collation information into encryption information and additional repeater information. Then, a decrypting unit 331 divides the encryption information into decrypted anatomical information (such as finger print feature information) and a criterion value. A anatomical information collating unit 234 collates the anatomical information with the registration information of a anatomical information storage unit 233 which registers the finger print information in advance.

A criterion value analyzing unit 332 calculates a criterion value based on the additional repeater information, and a criterion value comparing unit 333 compares the calculated criterion value with the decrypted criterion value. If it is judged that the collation result of anatomical information and the collation result of a criterion value both meet all the requirements, the authentication result indicating that the user should be authenticated is transmitted to a network. If the collation, comparison or verification result of either anatomical information or a criterion value does not meet the requirements, the authentication result indicating that the user should not be authenticated is transmitted to the network.

Figure 27:
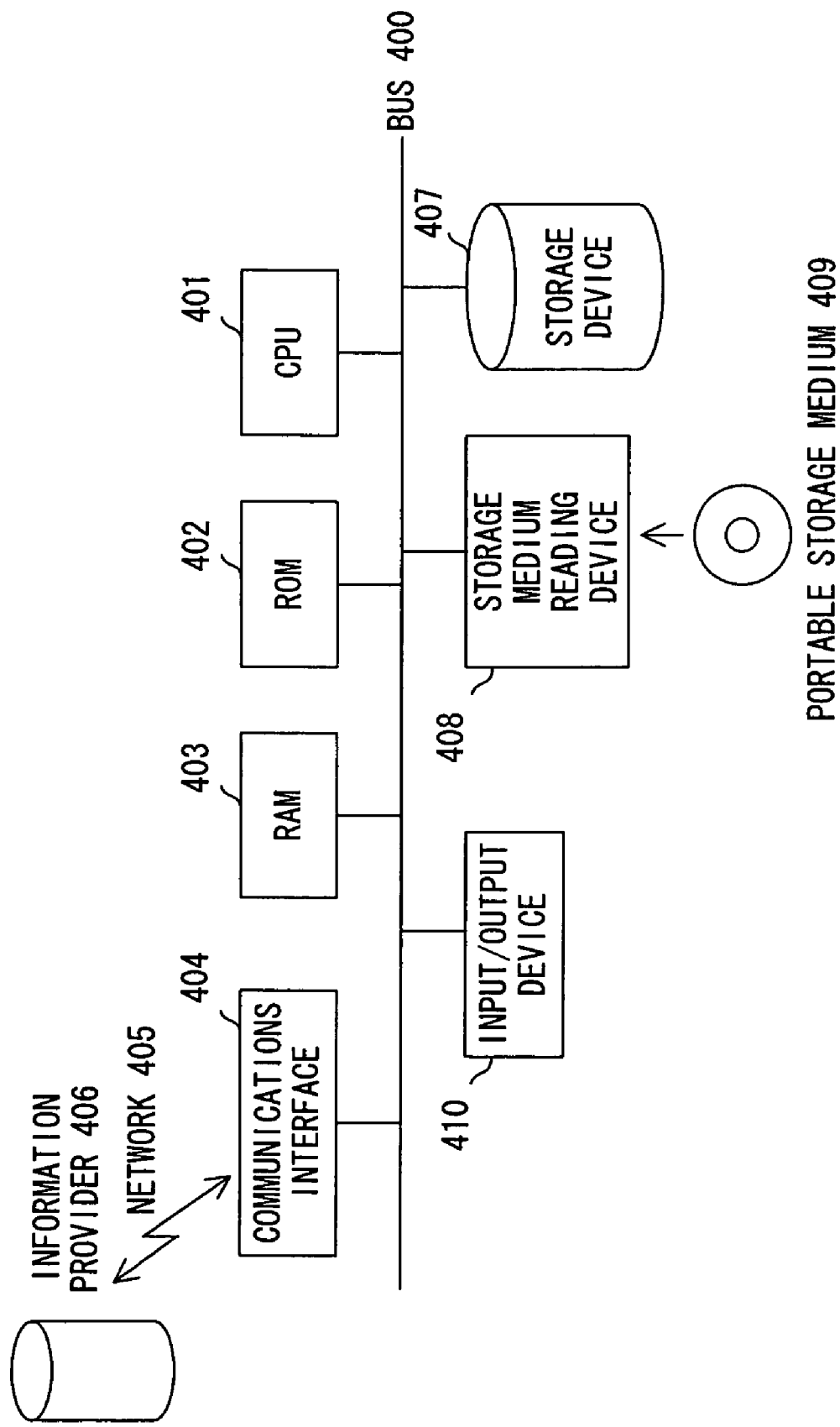
FIG. 27 shows the hardware configuration needed when the preferred embodiments described above are implemented by software.

FIG. 27 shows the hardware configuration for implementing by software the preferred embodiments described above.

If the preferred embodiments of the present invention are implemented by software (a program), the execution device of the program comprises the following devices which are connected to a CPU (central processing unit) 401 by a bus 400. A ROM 402 stores a BIOS, etc. If the CPU is switched on, the CPU 401 can access the ROM (read only memory) 402, can read the BIOS and can control each of the devices. The ROM 402 can also store a program for implementing the preferred embodiment of the present invention. In this case, as soon as the CPU is switched on, the program can be executed and can be used as a collation information generating unit for anatomical information or a dedicated collation device for collation information.

The program can also be stored in a storage device 407, such as a hard disk, etc., can be stored in a RAM (random access memory) 403 and can be executed by the CPU 401, if required. Alternatively, the program can be stored in a portable storage medium 409(e.g. CD-ROM, DVD, MO, floppy disk, etc.), can be read into the RAM 403 by a storage medium reading device 408 and can be executed by the CPU 401, if required. The program stored in the portable storage medium 409 can also be stored in the storage device 407 and can also be executed by the CPU 401.

Alternatively, the program can be downloaded from an information provider 406 by connecting the CPU to a network 405 using a communications interface 404. If as described with reference to FIG. 18, etc., both an anatomical information collecting device and a collation device are connected to the network 405 and are used, for example, the information provider 406 can be regarded as a collation device. In this case, the CPU shown in FIG. 27 generates collation information, transmits the collation information to the information provider 406 and receives the authentication result. Alternatively, the roles can be exchanged between the device and the information provider 406. Furthermore, instead of downloading the program via the network 405, the program can also be executed in a network environment without downloading the program.

An input/output device usually comprises a keyboard, a mouse, a display, etc. However, if the device is used as an anatomical information collecting device, a sensor for collecting anatomical information is further needed. The display displays an authentication result, specifically indicates whether or not the user should be authenticated. Furthermore, if an entrance permit to a computer room in which important data is handled is authenticated, the input/output device further comprises a mechanism for locking/unlocking the computer room, etc.

According to the authentication system using anatomical information of the present invention, the alteration of anatomical information by a third party can be eliminated and thereby a system for implementing high security can be provided.

What is claimed is:

1. An authentication device using anatomical information, comprising:
   an anatomical information generating unit generating anatomical information based on a collected image;
   an identification information generating unit generating identification information which comprises at least anatomical collection order information specifying a collection order of the anatomical information generated in the anatomical information generating unit; and
   a collation information generating unit generating collation information by combining the anatomical information and identification information,
   wherein the anatomical collection order information is retrieved from the identification information after the identification information is generated and a new piece of identification information is added to the anatomical information every time the anatomical information passes through a different device.

2. The authentication device according to claim 1, wherein anatomical information and identification information are encrypted.

3. A collation information generating method using anatomical information, comprising:
   generating anatomical information based on a collected image;
   generating identification information which comprises at least order information specifying a collection order of the anatomical information generated in the anatomical information; and
   generating collation information by combining the anatomical information and identification information,
   wherein a new piece of identification information is added to the anatomical information every time the anatomical information passes through a different device.

4. The method according to claim 3, wherein anatomical information and identification information are encrypted.

5. A computer-readable storage medium on which a program having a computer realize a collation information generating method using anatomical information is recorded, the method comprising:
   generating anatomical information based on a collected image;
   generating identification information which comprises at least order information specifying a collection order of anatomical information generated in the anatomical information; and
   generating collation information by combining the anatomical information and identification information,
   wherein a new piece of identification information is added to the anatomical information every time the anatomical information passes through a different device.

6. The computer-readable medium according to claim 5, wherein anatomical information and identification information are encrypted.

* * * * *

UNITED STATES PATENT AND TRADEMARK OFFICE
CERTIFICATE OF CORRECTION

PATENT NO. : 6,987,869 B1
APPLICATION NO. : 09/627096
DATED : January 17, 2006
INVENTOR(S) : Jun Ikegami et al.

It is certified that error appears in the above-identified patent and that said Letters Patent is hereby corrected as shown below:

Column 18, line 32, after "computer-readable" insert --storage--.

Signed and Sealed this

Seventh Day of November, 2006

JON W. DUDAS
*Director of the United States Patent and Trademark Office*